(12) United States Patent
Nakahori

(10) Patent No.: US 7,697,306 B2
(45) Date of Patent: Apr. 13, 2010

(54) DC/DC CONVERTER

(75) Inventor: Wataru Nakahori, Tokyo (JP)

(73) Assignee: TDK Corporation, Tokyo (JP)

( * ) Notice: Subject to any disclaimer, the term of this patent is extended or adjusted under 35 U.S.C. 154(b) by 211 days.

(21) Appl. No.: 12/061,345

(22) Filed: Apr. 2, 2008

(65) Prior Publication Data

US 2008/0247195 A1    Oct. 9, 2008

(30) Foreign Application Priority Data

Apr. 9, 2007    (JP) .............................. 2007-102145

(51) Int. Cl.
*H02M 3/335* (2006.01)
*H02M 7/5387* (2006.01)
(52) U.S. Cl. ........................................ 363/17; 363/132
(58) Field of Classification Search ................ 363/16, 363/17, 20, 21.01, 21.02, 97, 98, 131, 132; 336/170, 180–183, 225, 232
See application file for complete search history.

(56) References Cited

U.S. PATENT DOCUMENTS

| 6,388,897 | B1 * | 5/2002 | Ying et al. ..................... 363/17 |
| 7,362,596 | B2 * | 4/2008 | Gjerde et al. .................. 363/69 |
| 7,589,980 | B2 * | 9/2009 | Aso ............................. 363/17 |
| 2004/0037092 | A1 | 2/2004 | Kurio et al. | |
| 2009/0168461 | A1 * | 7/2009 | Nakahori ...................... 363/17 |

FOREIGN PATENT DOCUMENTS

| JP | A 62-81977 | 4/1987 |
| JP | A 62-81978 | 4/1987 |
| JP | A 62-210861 | 9/1987 |
| JP | A 03-230756 | 10/1991 |
| JP | A 07-154967 | 6/1995 |
| JP | B2 2629999 | 4/1997 |
| JP | A 2004-088814 | 3/2004 |

* cited by examiner

*Primary Examiner*—Matthew V Nguyen
(74) *Attorney, Agent, or Firm*—Oliff & Berridge, PLC

(57) ABSTRACT

According to the switching supply such as a DC/DC converter, since primary side coils provided in two transformers are mutually connected in series, voltage variation generated in parallel-connected secondary side coils can be suppressed, and the uniformity of secondary side parallel output can be enhanced even in case of voltage value fluctuations or the like caused by variation in the output of an inverter circuit.

5 Claims, 31 Drawing Sheets

DC/DC CONVERTER

BACKGROUND OF THE INVENTION

1. Field of the Invention

The present invention relates to a switching supply such as a DC/DC converter or the like comprising a plurality of connected transformers.

2. Related Background Art

A conventional switching supply such as a DC/DC converter is disclosed in, for instance, Japanese Patent No. 2,629,999. The DC/DC converter disclosed in Japanese Patent No. 2,629,999 comprises two connected output transformers. In a first output transformer, two primary side coils are arranged along the same magnetic path and with the same polarity. One primary side coil in the first output transformer and one primary side coil in the second output transformer are switched by a first driving circuit, while another primary side coil in the first output transformer and another primary side coil in the second output transformer are switched by a second driving circuit, to stabilize thereby the DC/DC converter. Secondary side coils of the transformers are connected to a rectifier circuit that outputs a desired DC voltage.

SUMMARY OF THE INVENTION

When plural transformers are operated in parallel and there is variation in the output of inverter circuits connected to the respective transformers, there occur problems such as variation in the output of the respective transformers, which precludes enhancing the uniformity of parallel output at the secondary side. In the light of the above problems, it is an object of the present invention to provide a switching supply such as a DC/DC converter that can enhance output uniformity.

The switching supply such as a DC/DC converter envisaged in order to solve the above problems is a switching supply comprising an input part; an output part; a first transformer having a first coil group; a second transformer having a second coil group; an inverter circuit connected between the input part and an input terminal of the first and second transformers; and a rectifier smoothing circuit connected between the output part and an output terminal of the first and second transformers.

The switching supply comprises a first coil pair having a primary side coil and a secondary side coil magnetically coupled; a second coil pair having a primary side coil and a secondary side coil magnetically coupled; a third coil pair having a primary side coil and a secondary side coil magnetically coupled; and a fourth coil pair having a primary side coil and a secondary side coil magnetically coupled.

The first coil group has the first and third coil pairs; the second coil group has the second and the fourth coil pairs; the primary side coils included in the first and second coil pairs are mutually connected in series between an input terminal of the first transformer and an input terminal of the second transformer; the primary side coils included in the third and fourth coil pairs are mutually connected in series between an input terminal of the first transformer and an input terminal of the second transformer; the secondary side coils included in the first and third coil pairs are mutually connected in parallel to the output part; and the secondary side coils included in the second and fourth coil pairs are mutually connected in parallel to the output part.

In such a switching supply, the primary side coils provided in the two transformers are connected in series, and hence uniform output can be expected even in case of voltage value fluctuations or the like caused by inverter circuit variation. That is, primary side current flowing through one transformer and primary side current flowing through the other transformer fluctuate equally.

Preferably, the first coil group and the second coil group are each arrayed on a same axis. Arranging the coils distributedly between a first axis and a second axis allows achieving a lower profile vis-à-vis the case where all coils are stacked on the same axis. Connection in a substrate vertical direction is normally complex and requires multiple components. The switching supply of the present invention functions with the primary side coils connected in series on different axes and with the secondary side coils connected in parallel on the same axis, as prescribed above. Connection wiring of the primary side coils can extend thus in the horizontal direction, and not the vertical direction. This allows using hence a simple connection structure, such as printed wiring or the like, and allows realizing connection with few components. The device can be made smaller as a result.

Preferably, the primary side coils of the first coil pair and the primary side coils of the second coil pair are formed on a same substrate, and the primary side coils of the third coil pair and the primary side coils of the fourth coil pair are formed on a same substrate that differs from the substrate where the primary side coils of the first coil pair and the second coil pair are formed. A switching supply having such a structure can be configured by arranging planar coils on a same substrate. This affords, as a result, a lower profile.

Preferably, the AC resistance of the primary side coils included in the first and fourth coil pairs, and the AC resistance of the primary side coils included in the second and third coil pairs are set such that one becomes alternately higher than the other, in synchronization with the switching of the inverter circuit.

As described above, the primary side coils of the first and second coil pairs are connected in series. Therefore, the AC resistance of the primary side coils in the first coil pair and the second coil pair increases alternately. Similarly, the primary side coils of the third coil pair and the fourth coil pair are connected in series. Therefore, the AC resistance of the primary side coils in the third coil pair and the fourth coil pair increases alternately.

In the secondary side coils there is induced normally current having an opposite orientation to that of the primary side coils. Therefore, the influence of the skin effect and the proximity effect diminishes, and AC resistance decreases, when the secondary side coils are adjacent. Thus, the AC resistance of the primary side coils can be increased by arresting the output current of the secondary side coils adjacent to the primary side coils, on the basis of, for instance, the reverse breakdown voltage of diodes.

Connecting in series, as described above, a primary side coil having high AC resistance with a primary side coil having low AC resistance, has the effect of causing the AC resistance to absorb the oscillation generated within the primary side coil sequence and the corresponding secondary side coil sequence, so that ringing can be suppressed as a result. The above affords the effect of further enhancing stability while reducing the size of the switching supply.

The switching supply such as the DC/DC converter of the present invention allows thus enhancing output uniformity.

DESCRIPTION OF THE PREFERRED EMBODIMENTS

Figure 1:
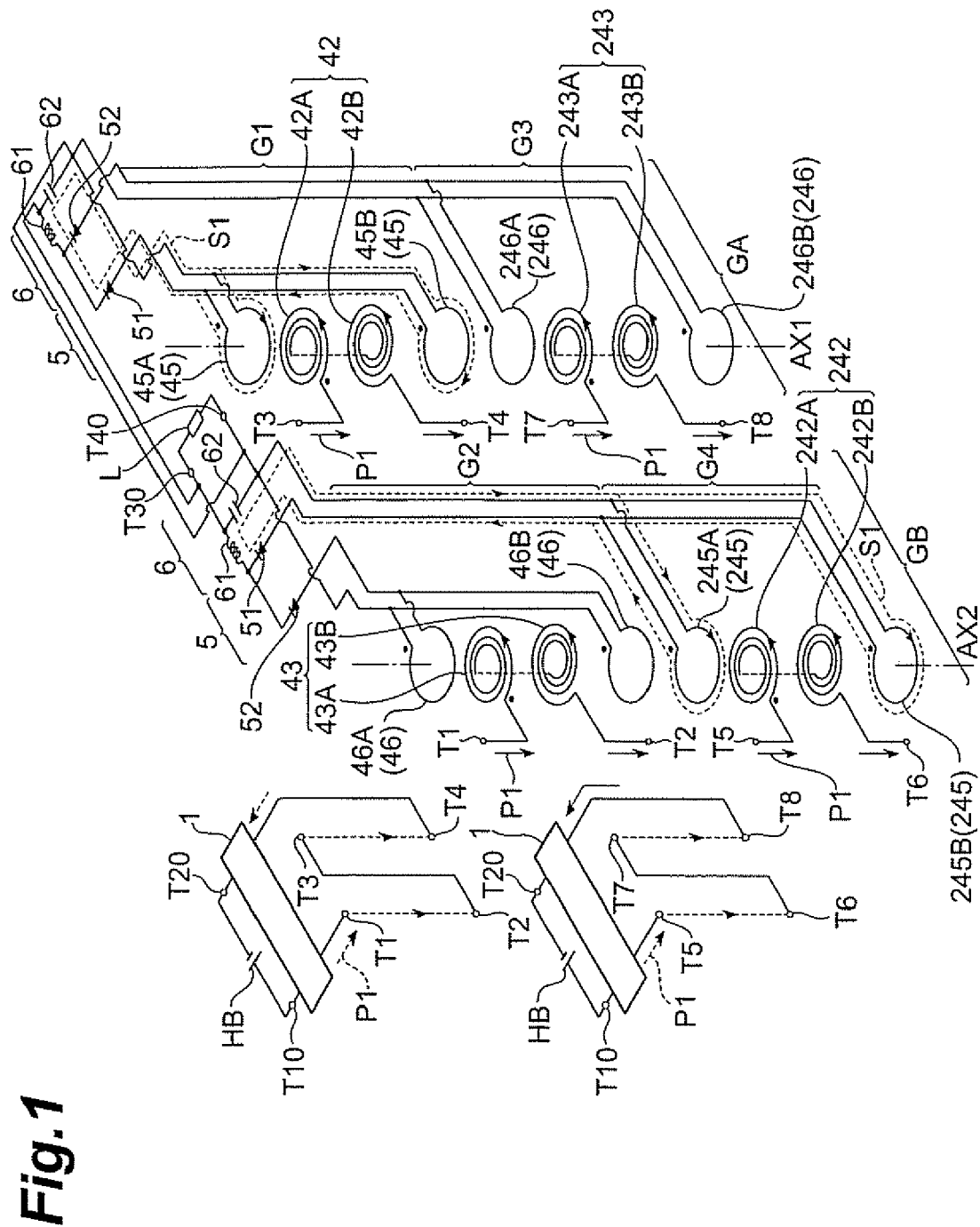
FIG. 1 is a circuit diagram of a DC/DC converter.

A DC/DC converter according to an embodiment is explained as an example of a switching supply. Identical elements are denoted with identical reference numerals, and recurrent explanations thereof are omitted.

FIG. 1 is a circuit diagram of a DC/DC converter.

In the DC/DC converter, the output side of a first transformer GA and a second transformer GB are connected in parallel, such that there can be obtained an amount of current that is twice that of each transformer. The first transformer GA has an upper-stage coil group area G1 and a lower-stage coil group area G3. The second transformer GB has an upper-stage coil group area G2 and a lower-stage coil group area G4. The coil group areas G1, G2, G3 and G4 comprise each at least one pair of coil pairs, such coil pairs comprising each a primary side coil and a secondary side coil magnetically coupled.

A primary side coil 42 of the upper-stage coil group area G1 of the first transformer GA is connected in series with a primary side coil 43 of the upper-stage coil group area G2 of the second transformer GB. A primary side coil 243 of the lower-stage coil group area G3 of the first transformer GA is connected in series with a primary side coil 242 of the lower-stage coil group area G4 of the second transformer GB.

A secondary side coil 45 of the upper-stage coil group area G1 of the first transformer GA, and a secondary side coil 46 of the upper-stage coil group area G2 of the second transformer GB are connected in parallel to a load L between output parts T30, T40 of the converter, the load L being connected between the output parts T30, T40 of the converter. A secondary side coil 245 of the lower-stage coil group area G4 of a fourth transformer GB, and a secondary side coil 246 of the lower-stage coil group area G3 of a third transformer GA are connected in parallel to the load L between the output parts T30, T40 of the converter.

The primary side coil 42 comprises coils 42A, 42B connected in series in such a manner that the magnetic fields generated by current flowing therethrough have the same orientation. The secondary side coil 45 comprises coils 45A, 45B connected in parallel in such a manner that the magnetic fields generated by current flowing in a same direction have the same orientation.

The primary side coil 43 comprises coils 43A, 43B connected in series in such a manner that the magnetic fields generated current flowing therethrough have the same orientation. The secondary side coil 46 comprises coils 46A, 46B connected in parallel in such a manner that the magnetic fields generated by current flowing in a same direction have the same orientation.

The primary side coil 242 comprises coils 242A, 242B connected in series in such a manner that the magnetic fields generated current flowing therethrough have the same orientation. The secondary side coil 245 comprises coils 245A, 245B connected in parallel in such a manner that the magnetic fields generated by current flowing in a same direction have the same orientation.

The primary side coil 243 comprises coils 243A, 243B connected in series in such a manner that the magnetic fields generated current flowing therethrough have the same orientation. The secondary side coil 246 comprises coils 246A, 246B connected in parallel in such a manner that the magnetic fields generated by current flowing in a same direction have the same orientation.

The inverter circuit 1 connected to the upper-stage coil group areas G1, G2 is connected to input terminals T1 and T4 of the transformer. The unidirectional current outputted by the inverter circuit 1 flows from one input terminal T1, through the primary side coils 43A, 43B, to an internal terminal T2, and to an internal terminal T3 via internal wiring. Next, the current flows through the primary side coils 42A, 42B, and out of the other input terminal T4. The reference numeral P1 denotes such a current path.

The orientation of the magnetic field generated by the primary side coils 42, 43 does not change when the terminal T1 is connected to the terminal T4, instead of the terminal T2 being connected to the terminal T3, and current flows from the terminal T3 to the terminal T4, i.e. when current flows from the series-connected primary side coil 42 to the primary side coil 43. Such connections, as circuits constituting the transformer, are thus equivalent.

The upper-stage current path will be explained first.

When current flows through the current path P1, a current flowing through a current path S1, in the opposite direction of that of the primary side coil 42, is generated in the secondary side coil 45 of the first transformer GA. One end of the winding start of the secondary side coil 45 is connected to an anode of a diode 51 of the first transformer GA, while the other end is connected to a capacitor 62. When the current flowing through the secondary side coil 45 passes through the current path S1, therefore, it returns from the one end of the winding start to the other end of the secondary side coil 45 via the diode 51, the coil 61 and the capacitor 62 of the first transformer GA.

The output voltage of the transformer is an AC voltage at both ends of the secondary side coil 45. This voltage is smoothed by the coil 61 and the capacitor 62, becoming a DC output voltage of the converter that is generated between both ends of the capacitor 62.

At this time, the current flowing through the primary side coil 42 and the secondary side coil 45 has an opposite orientation. This reduces hence the skin effect and the proximity effect, thus diminishing the AC resistance of the primary side coil 42.

On the other hand, the AC resistance is increased at this time at the primary side coil 43 connected in series to the primary side coil 42. That is, current would flow through the secondary side coil 46 in the opposite orientation to that of the primary side coil 43, to flow out of the winding start position. This current, however, is arrested by the diodes 51, 52 of the second transformer GB.

Thus, a first AC resistance is connected so as to be higher than a second AC resistance. Since the primary side coil 42 and the primary side coil 43 are connected in series, ringing generated in the coils can be suppressed by being absorbed by the high AC resistance component.

The lower-stage current path is explained next.

The lower-stage configuration results from swapping the coil groups relating to the upper-stage first transformer GA and the coil groups relating to the second transformer GB.

The inverter circuit 1 connected to the lower-stage coil group areas G4, G3 is connected to input terminals T5 and T8 of the transformer. The unidirectional current outputted by the inverter circuit 1 flows from one input terminal T5, through the primary side coils 242A, 242B, to the internal terminal T6, and to the internal terminal T7 via internal wiring. Next, the current flows through the primary side coils 243A, 243B, and out of the other input terminal T8. The reference numeral P1 denotes such a current path.

The orientation of the magnetic field generated by the primary side coils 243, 242 does not change when the terminal T5 is connected to the terminal T8, instead of the terminal T6 being connected to the terminal T7, and current flows from the terminal T7 to the terminal T8, i.e. when current flows from the series-connected primary side coil 243 to the primary side coil 242. Such connections, as circuits constituting the transformer, are thus equivalent.

When current flows through the current path P1, a current flowing through a current path S1 in the opposite direction to that of the primary side coil 242 is generated in the secondary side coil 245 of the second transformer GB. One end of a winding start of the secondary side coil 245 is connected to an anode of a diode 51 of the second transformer GB, while the other end is connected to a capacitor 62. When the current flowing through the secondary side coil 245 passes through the current path S1, therefore, it returns from the one end of the winding start to the other end of the secondary side coil 245 via the diode 51, the coil 61 and the capacitor 62 of the second transformer GB.

The output voltage of the transformer is an AC voltage at both ends of the secondary side coil 245. This voltage is smoothed by the coil 61 and the capacitor 62, becoming a DC output voltage of the converter that is generated between both ends of the capacitor 62. The capacitors 62 of the respective transformers GA, GB are connected in parallel, so that more current flows to the load L than is the case for a single transformer.

At this time, the current flowing through the primary side coil 242 and the secondary side coil 245 has an opposite orientation, which reduces hence the skin effect and the proximity effect, thus diminishing the AC resistance of the primary side coil 242.

On the other hand, the AC resistance is increased at this time at the primary side coil 243 connected in series to the primary side coil 242. That is, current would flow through the secondary side coil 246 of the first transformer GA in the opposite orientation to that of the primary side coil 243, to flow out of the winding start position. This current, however, is arrested by the diodes 51, 52 of the first transformer GA.

Thus, a first AC resistance is connected so as to be higher than a second AC resistance. Since the primary side coil 242 and the primary side coil 243 are connected in series, ringing generated in the coils can be suppressed by being absorbed by the high AC resistance component.

In other words, secondary side coil current flows through one of the upper-stage coil group areas G1, G2 but not through the other. Also, secondary side coil current flows through one of the lower-stage coil group areas G3, G4, but not through the other. Consequently, ringing can be suppressed homogeneously overall.

Figure 2:
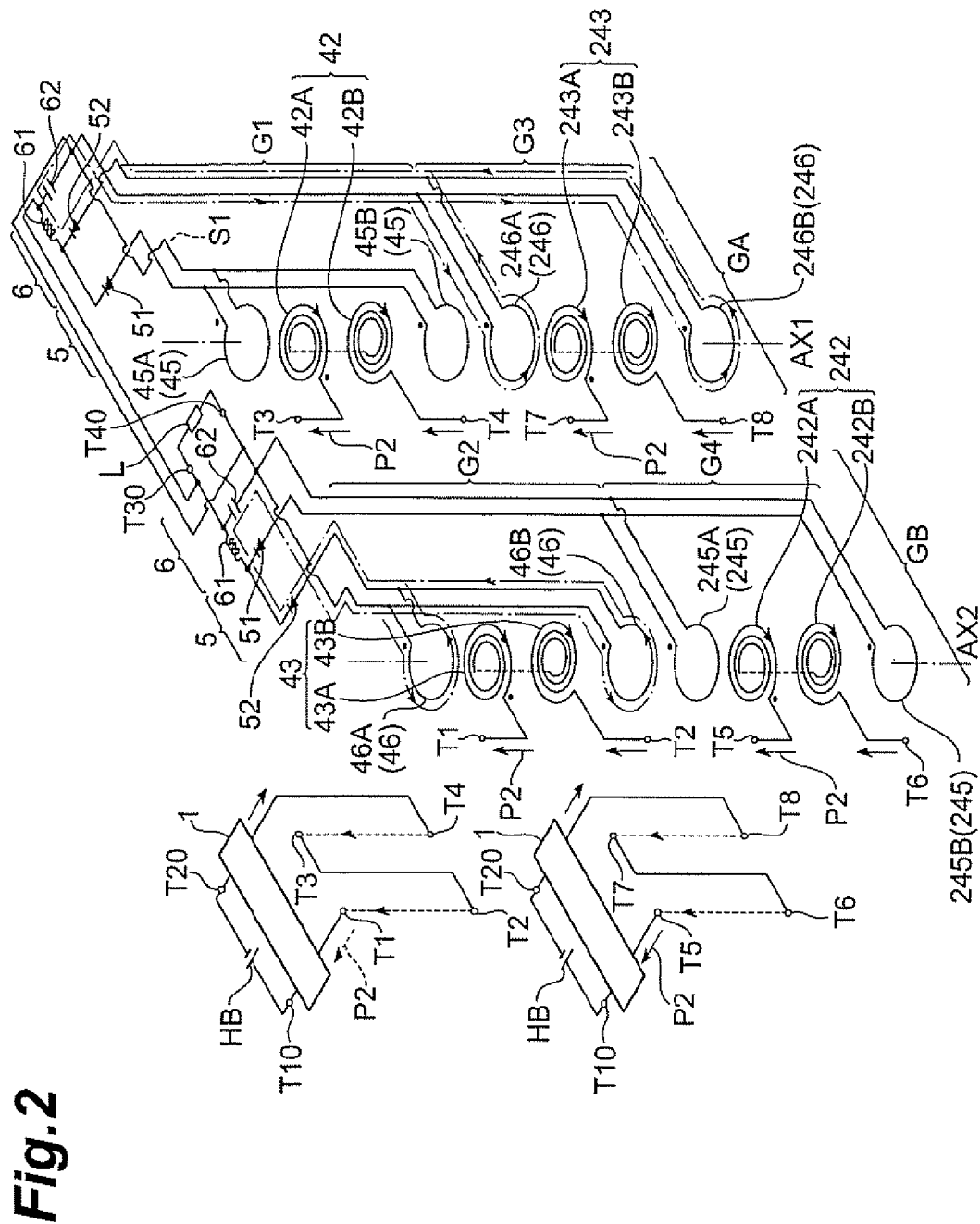
FIG. 2 is a circuit diagram of a DC/DC converter.

FIG. 2 is a circuit diagram of a DC/DC converter. FIG. 2 illustrates a situation in which current flows out of the inverter circuit 1 in the opposite direction.

When current flows from the terminal T4 side to the terminal T1, contrary to the above-described current, in the inverter circuit 1 connected to the upper-stage coil group areas G1, G2, i.e. when current flows through the current path P2, the operation becomes the inverse of the above-described operation.

Specifically, when current flows through the primary side coil 42 of the first transformer GA and through the primary side coil 242 of the second transformer GB, current in the opposite direction thereto would flow through the secondary side coils 45, 245 respectively adjacent to the foregoing, to flow in at the winding start position. Such a current, however, is arrested by the diodes 51 of the respective transformers.

When current flows through the primary side coil 243 of the first transformer GA and through the primary side coil 43 of the second transformer GB, current in the opposite direction thereto would flow through the secondary side coils 246, 46 respectively adjacent to the foregoing, to flow in at the winding start position. Such a current flows out through the position at the winding ends of the coils 246, 46, and returns to the winding start via the diode 52, the coil 61 and the capacitor 62 of the respective transformers.

The DC/DC converter comprises the inverter circuit 1 connected to the primary side coil group of the transformer, and a smoothing circuit 6 and a rectifier circuit 5 connected to the secondary side coil group of the transformer. As illustrated in the figure, the rectifier circuit 5 comprises the diodes 51, 52 connected with each other, while the smoothing circuit 6 comprises the coil 61 and the capacitor 62. The foregoing make up overall a rectifier smoothing circuit. The inverter circuit 1 is connected to a supply HB via input parts T10, T20. A smoothing circuit comprising a capacitor may also be provided at the input part side of the inverter circuit 1.

The above-described DC/DC converter comprises a first transformer GA comprising a first coil group (42, 45, 243, 246) arrayed along a first axis AX1, and a second coil group (43, 46, 242, 245) arrayed along a second axis AX2 separated from the first axis AX1; a second transformer GB connected in series to the first transformer GA; an inverter circuit 1 connected between input parts T10, T20 of the converter and input terminals T1, T4 (T5, T8) of the first transformer GA and the second transformer GB; and rectifier smoothing circuits 5, 6 connected between output parts T30, T40 of the converter and output terminals of the first transformer GA and the second transformer GB.

The first axis AX1 and the second axis AX2 are parallel, and comprise each a magnetic core such as an inner leg of an E-type core or the like.

The primary side coils and the secondary side coils at the respective coil group areas G1, G2, G3 and G4 are magnetically coupled forming pairs.

That is, the DC/DC converter comprises a first coil pair (G1) having the primary side coil 42 and the secondary side coil 45, a second coil pair (G2) having the primary side coil 43 and the secondary side coil 46 magnetically coupled, a third coil pair (G3) having the primary side coil 243 and the secondary side coil 246 magnetically coupled, and a fourth coil pair (G4) having the primary side coil 242 and the secondary side coil 245 magnetically coupled.

The first coil group has the first and third coil pairs (G1, G3). The second coil group has the second and the fourth coil pairs (G2, G4). The primary side coils 42, 43 included in the first and second coil pairs (G1, G2), are connected in series between the input terminal T4 of the first transformer GA and the input terminal T1 of the second transformer GB. The primary side coils 243, 242 included in the third and fourth coil pairs (G3, G4) are connected in series between the input terminal T5 of the second transformer GB and the input terminal T8 of the first transformer GA. The secondary side coils 45, 246 included in the first and third coil pairs (G1, G3) are connected in parallel to the load L between the output parts T30, T40 of the converter. The secondary side coils 46, 245 included in the second and fourth coil pairs (G2, G4) are connected in parallel to the load L between the output parts T30, T40 of the converter.

In such a DC/DC converter, the primary side coils provided in the two transformers GA, GB are connected in series, so that the parallel output of the secondary side can be enhanced uniformly even in case of voltage value fluctuations or the like caused by inverter circuit variation. That is, the primary side coils 42 and 43 are connected in series, and hence equal current flows through them. Further, the primary side coils 242 and 243 are connected in series, and hence equal current flows through them. Moreover, the primary side coil 42 and the primary side coil 243 are magnetically coupled, and hence the voltages of the primary side coils 42 and 243 are proportional. The primary side coil 43 and the primary side coil 242 are also magnetically coupled, and the voltages of the primary side coils 43 and 242 are also proportional. Hence, the sum of the voltages of the primary side coils 42, 43 is equal to the sum of the voltages of the primary side coils 242 and 243, and the sum of the voltages of the primary side coils 42 and 243 is also equal to the sum of the voltages of the primary side coils 242 and 43. That is, the input voltage of the inverter is kept equal, and the voltages generated in the secondary side coils become also equal. This makes symmetrical the mutual influences between the respective coils at the secondary side, which is spatially symmetrical at the first transformer GA and the second transformer GB, enhancing thus the uniformity of the overall secondary side parallel output.

In such DC/DC converter, moreover, the coils are arranged distributedly between the first axis AX1 and the second axis AX2. A lower profile can be hence achieved vis-à-vis the case when all coils are arranged on the same axis. Normally, connection in the vertical direction of a substrate is complex, requiring numerous components. In the DC/DC converter of the present embodiment according to the above specification, however, the primary side coils 42, 43 (242, 243) are connected in series on different axes AX1, AX2, while the secondary side coils 45, 246 (46, 245) are connected in parallel on the same axis. The connection wiring of the primary side coils 42, 43 (242, 243) can extend thus in the horizontal direction, and not the vertical direction. This allows using hence a simple connection structure, such as printed wiring or the like, and allows carrying out connection with few components. The device can be made smaller as a result.

At least one primary side coil 42 included in the first coil pair (G1) and at least one primary side coil 43 included in the second coil pair (G2) are both planar coils formed on the same substrate. At least one primary side coil 243 included in the third coil pair (G3) and at least one primary side coil 242 included in the fourth coil pair (G4) are both planar coils formed on the same substrate. A DC/DC converter having such a structure can be thus configured by arranging planar coils on a same substrate. This affords, as a result, a lower profile.

The AC resistance of the primary side coils 42, 242 included in the first and fourth coil pairs (G1, G4), and the AC resistance of the primary side coils 43, 243 included in the second and third coil pairs (G2, G3) are set such that one becomes alternately higher than the other in synchronization with the switching of the inverter circuit 1.

The primary side coils 42, 43 of the first and second coil pairs (G1, G2) are connected in series, and hence the AC resistances of the primary side coils 42, 43 of the first coil pair (G1) and of the second coil pair (G2) increase alternately. Similarly, the primary side coils 243, 242 of the third coil pair (G3) and the fourth coil pair (G4) are connected in series, and hence the AC resistances of the primary side coils 243, 242 of the third coil pair (G3) and the fourth coil pair (G4) increase also alternately.

Connecting in series, as described above, a primary side coil having high AC resistance with a primary side coil having low AC resistance, has the effect of causing the AC resistance to absorb the oscillation generated within the primary side coil sequence and the corresponding secondary side coil sequence, so that ringing can be suppressed as a result. The above affords the effect of further enhancing stability while reducing the size of the DC/DC converter.

Moreover, the primary side coils 42, 43, 242, 243 are each flanked by two secondary side coils 45A and 45B, 46A and 46B, 245A and 245B, and 246A and 246B. This has the effect of uniformizing the magnetic field and achieving excellent stability.

Figure 3:
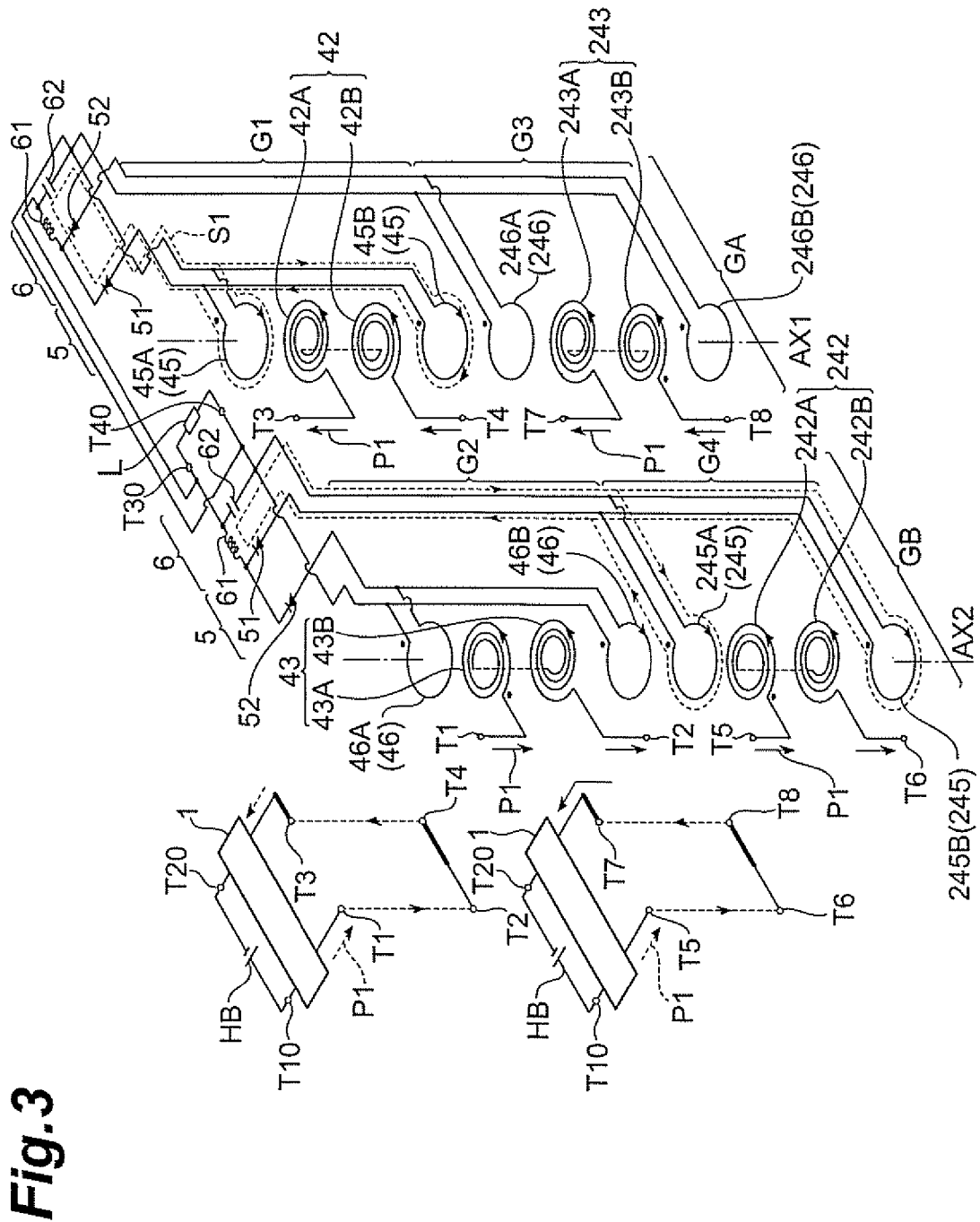
FIG. 3 is a circuit diagram of a DC/DC converter according to a modification.

FIG. 3 is a circuit diagram of a DC/DC converter according to a modification.

In this DC/DC converter, the polarity of the primary side coils 42, 243 of the first transformer GA is opposite to that illustrated in FIG. 1. Also, the terminal T2 is connected to the terminal T4 and the terminal T6 is connected to the terminal T8. Otherwise the configuration of the DC/DC converter is the same as that illustrated in FIG. 1. In the present wire connection, the orientation of the current flowing through the primary side coils 42, 243 is the same as that in FIG. 1, and hence the connection affords the same effect as that of FIG. 1.

Figure 4:
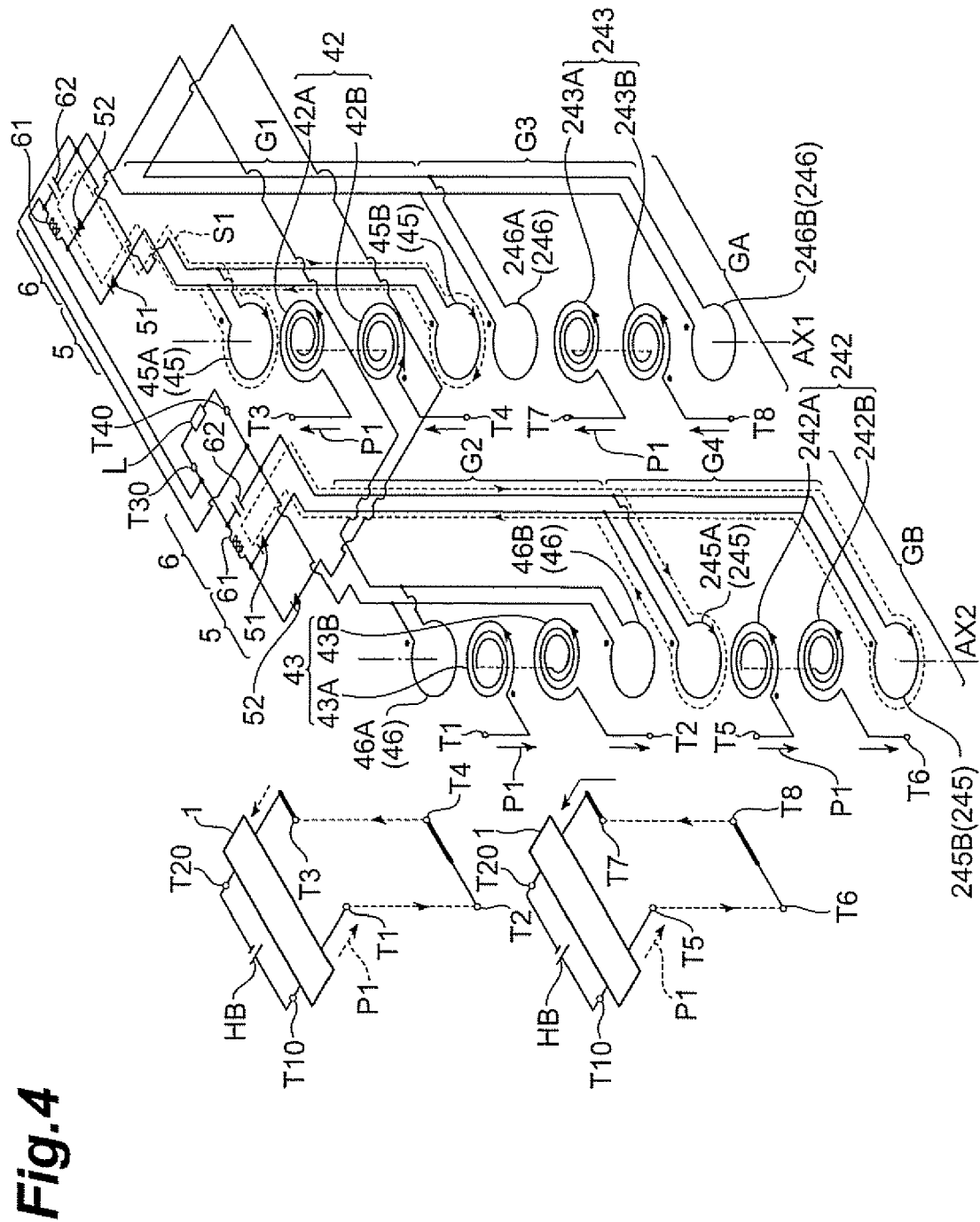
FIG. 4 is a circuit diagram of a DC/DC converter according to a modification.

FIG. 4 is a circuit diagram of a DC/DC converter according to a modification.

In this DC/DC converter, the connections of the diode 52 on the first transformer GA side and of the anode side of the diode 52 on second transformer GB side illustrated in FIG. 3 have been swapped. With reference to the above example, in this case the current that flowed through the diode 52 on the first transformer GA side flows instead through the diode 52 on the second transformer GB side, and the current that flowed through the diode 52 on the second transformer GA side flows instead through the diode 52 on the first transformer GB side. The operation of the DC/DC converter is identical to the above-described one, although current flows through the rectifier smoothing circuits connected to the respective diodes 52.

FIG. 5 is a diagram illustrating a sequence modification of the primary side coils and the secondary side coils.

Figure 5A:
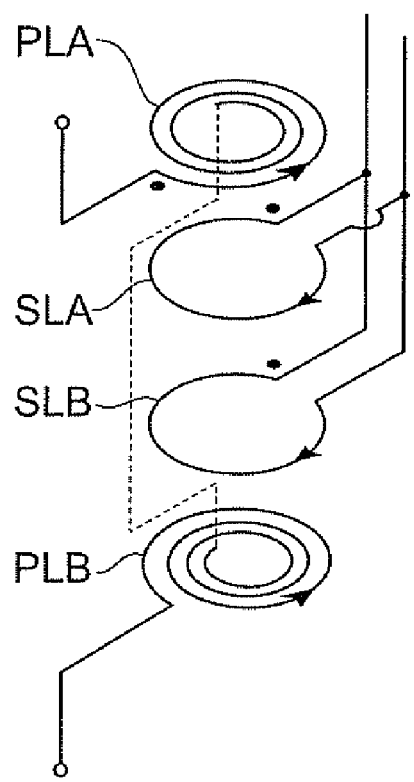
FIG. 5A is a diagram illustrating a modified sequence of primary side coils and secondary side coils.

The sequence of the primary side coils and the secondary side coils may be permuted as illustrated in FIG. 5A. That is, the sequence along one axis may be arranged in the order primary side coil PLA, secondary side coil SLA, secondary side coil SLB and primary side coil PLB. This sequence modification corresponds, for instance, to a reordering of the coil sequence of the upper-stage coil group area G1 of FIG. 1.

Figure 5B:
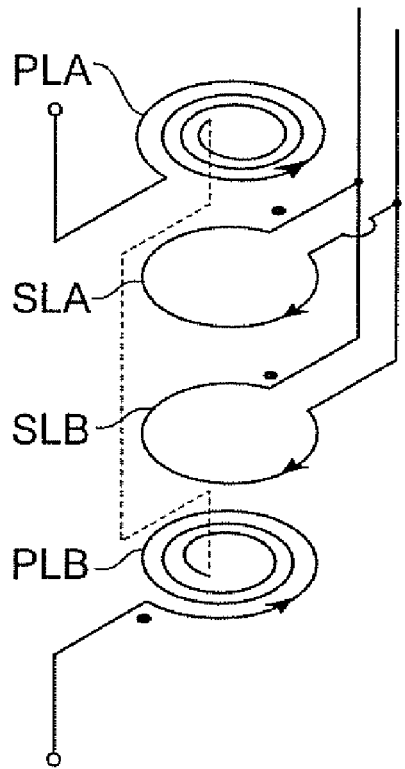
FIG. 5B is a diagram illustrating a modified sequence of primary side coils and secondary side coils.

The sequence of the primary side coil and the secondary side coil may be permuted as illustrated in FIG. 5B. That is, the sequence along one axis may be arranged in the order primary side coil PLA, secondary side coil SLA, secondary side coil SLB and primary side coil PLB. This sequence modification corresponds, for instance, to a reordering of the coil sequence of the upper-stage coil group area G1 of FIG. 3.

Figure 6:
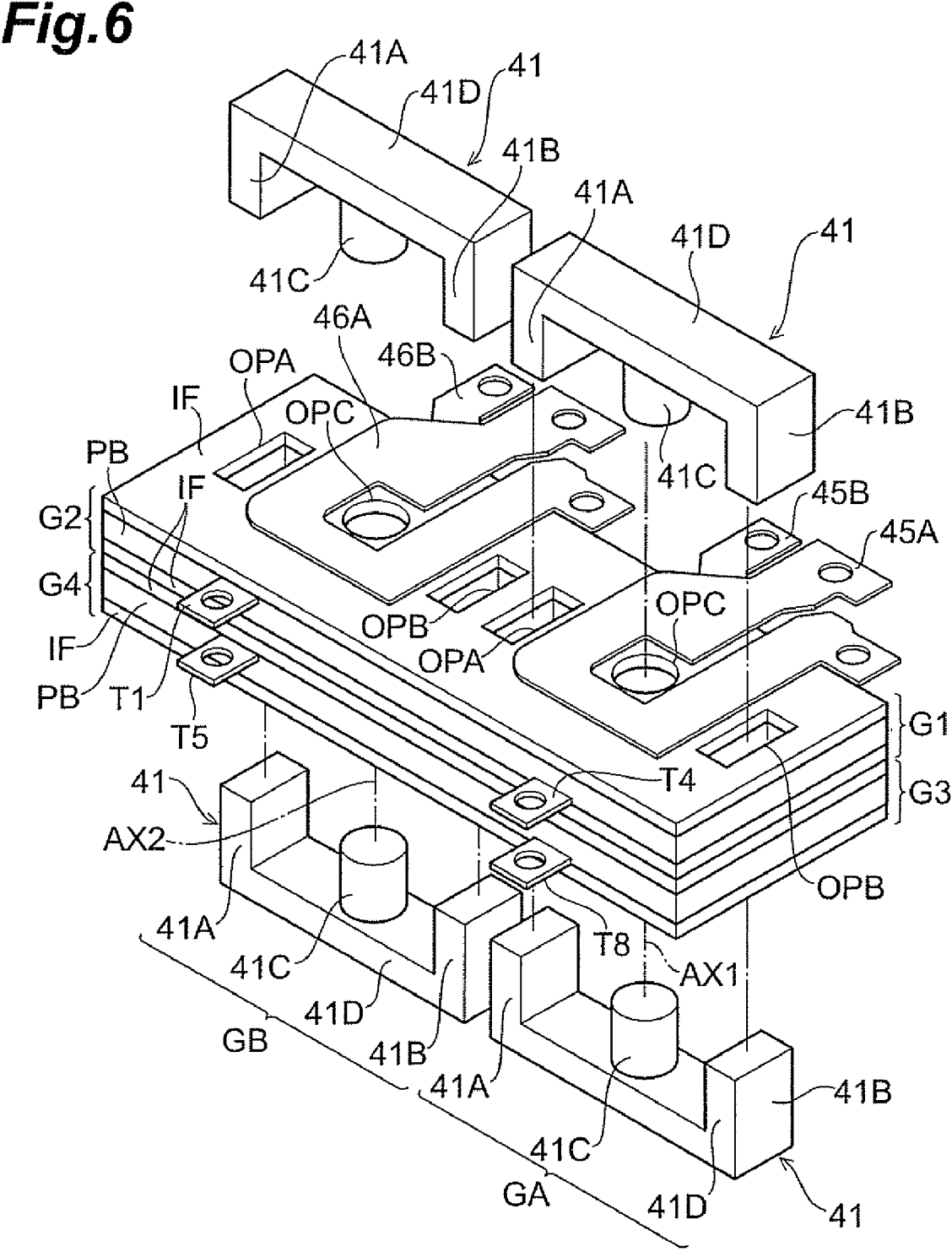
FIG. 6 is a perspective-view diagram of a transformer connected in parallel.
Figure 7:
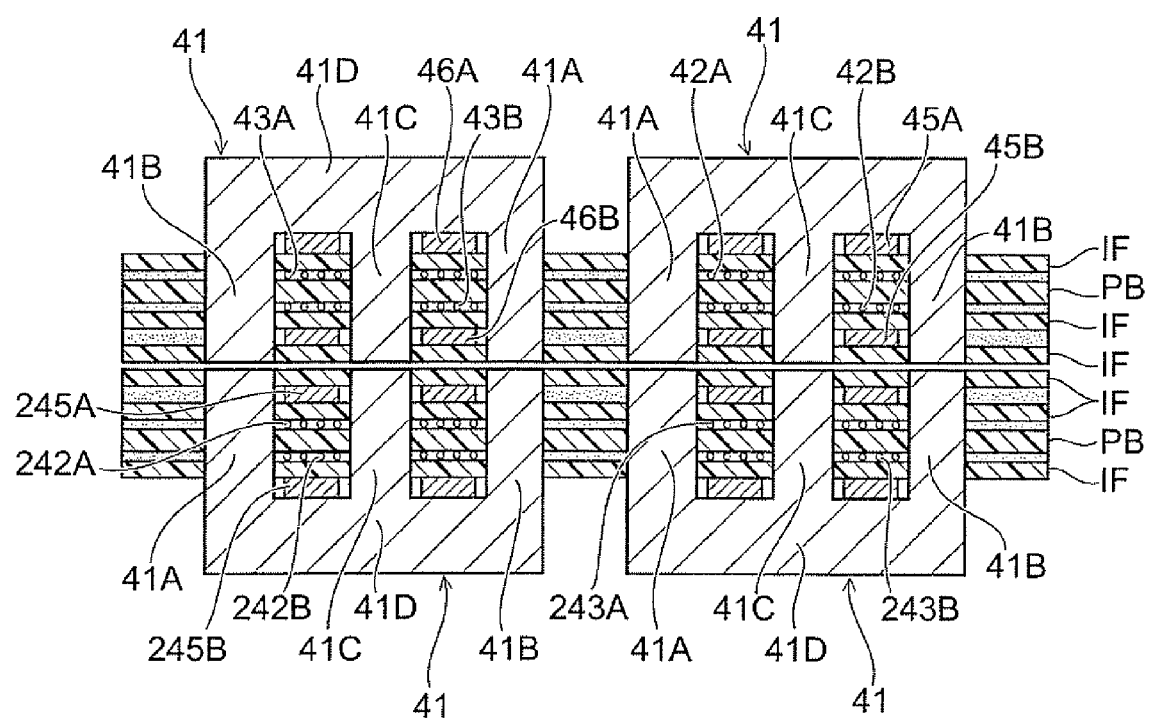
FIG. 7 is a vertical cross-sectional diagram of the transformer illustrated in FIG. 6.

FIG. 6 is a perspective-view diagram of a transformer connected in parallel, and FIG. 7 is a vertical cross-sectional diagram of the transformer illustrated in FIG. 6.

An E-type magnetic core 41 comprises center legs 41C standing on the center of a base 41D. The center leg 41C is positioned between legs 41A, 41B standing at both ends of the base 41D. The axes of the center legs 41C coincide respectively with the first axis AX1 and the second axis AX2.

The above-described various terminals protrude through the sides of a transformer stacked board. In such a transformer stacked board, the primary side coils are provided on top and under wiring boards PB, via insulating layers IF, with the secondary side coils 45A, 46A, as planar coils, arranged on a same plane. The secondary side coils 45B, 46B illustrated in FIG. 1 are also provided on the same plane. The secondary side coils 245A, 246A are also provided on the same plane. The secondary side coils 245B, 246B are also provided on the same plane. These coils also comprise a coiled planar coil. The secondary side coils are formed of sheet metal.

The center legs 41C run through respective through-holes OPC provided along the first axes AX of the transformer stacked board. The legs 41A, 41B at both ends run through respective through-holes OPA, OPB provided at positions flanking the through-hole OPC.

Upon flow of current in the primary side coils 42, 43, 243, 242, magnetic flux passes through the interior the center leg 41C. This magnetic flux, traverses the legs 41A, 41B at both ends, to make up a magnetic circuit. Magnetic coupling of adjacent coils becomes relatively stronger than magnetic coupling between separated coils.

The transformer stacked board has sequentially stacked therein, from the bottom up, the secondary side coils 246B, 245B, an insulating layer IF, the primary side coils 243B, 242B, a wiring board (insulating board) PB, the primary side coils 243A, 242A, an insulating layer IF, the secondary side coils 246A, 245A, an insulating layer IF, an insulating layer IF, the secondary side coils 45B, 46B, an insulating layer IF, the primary side coils 42B, 43B, a wiring board (insulating board) PB, the primary side coils 42A, 43A, an insulating layer IF, and the secondary side coils 45A, 46A. If needed, an adhesive is interposed between the wiring boards PB and the insulating layers IF.

Figure 8:
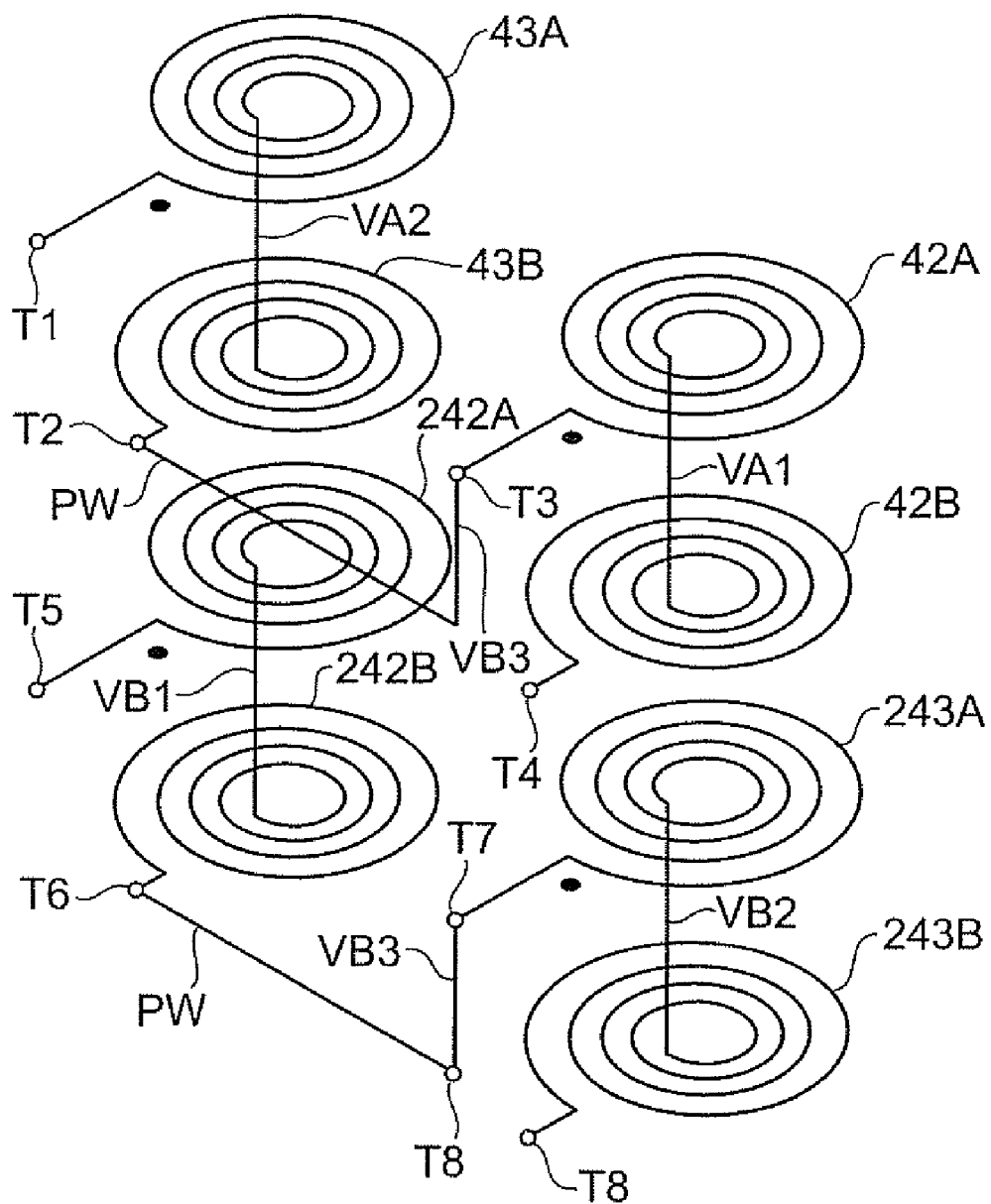
FIG. 8 is a diagram illustrating a wire connection of the primary side coils of the circuit illustrated in FIG. 1.

FIG. 8 is a diagram illustrating a wire connection of the primary side coil of the circuit illustrated in FIG. 1, corresponding to the structure of FIG. 7.

The terminal T1 is connected to an outer end of the primary side coil 43A. This outer end is connected to the innermost end of the primary side coil 43B by way of a via contact VA2 inside the board, from the innermost end of the coil. The terminal T2 and printed connection wiring PW are connected to the outermost end of the primary side coil 42A by way of a via contact VA3 and the terminal T3. This outer end is connected to the innermost end of the primary side coil 42B by way of a via contact VA1 inside the board, from the innermost end of the primary side coil 42A, and up to the terminal T4, via the outermost end of the primary side coil 42B.

The terminal T5 is connected to an outer end of the primary side coil 242A. This outer end is connected to the innermost end of the primary side coil 242B by way of a via contact VB1 inside the board, from the innermost end of the coil. The terminal T6 and printed connection wiring PW are connected to the outermost end of the primary side coil 243A by way of a via contact VB3 and the terminal T7. This outer end is connected to the innermost end of the primary side coil 243B by way of a via contact VB2 inside the board, from the innermost end of the primary side coil 243A, and up to the terminal T8 via the outermost end of the primary side coil 243B.

Figure 9:
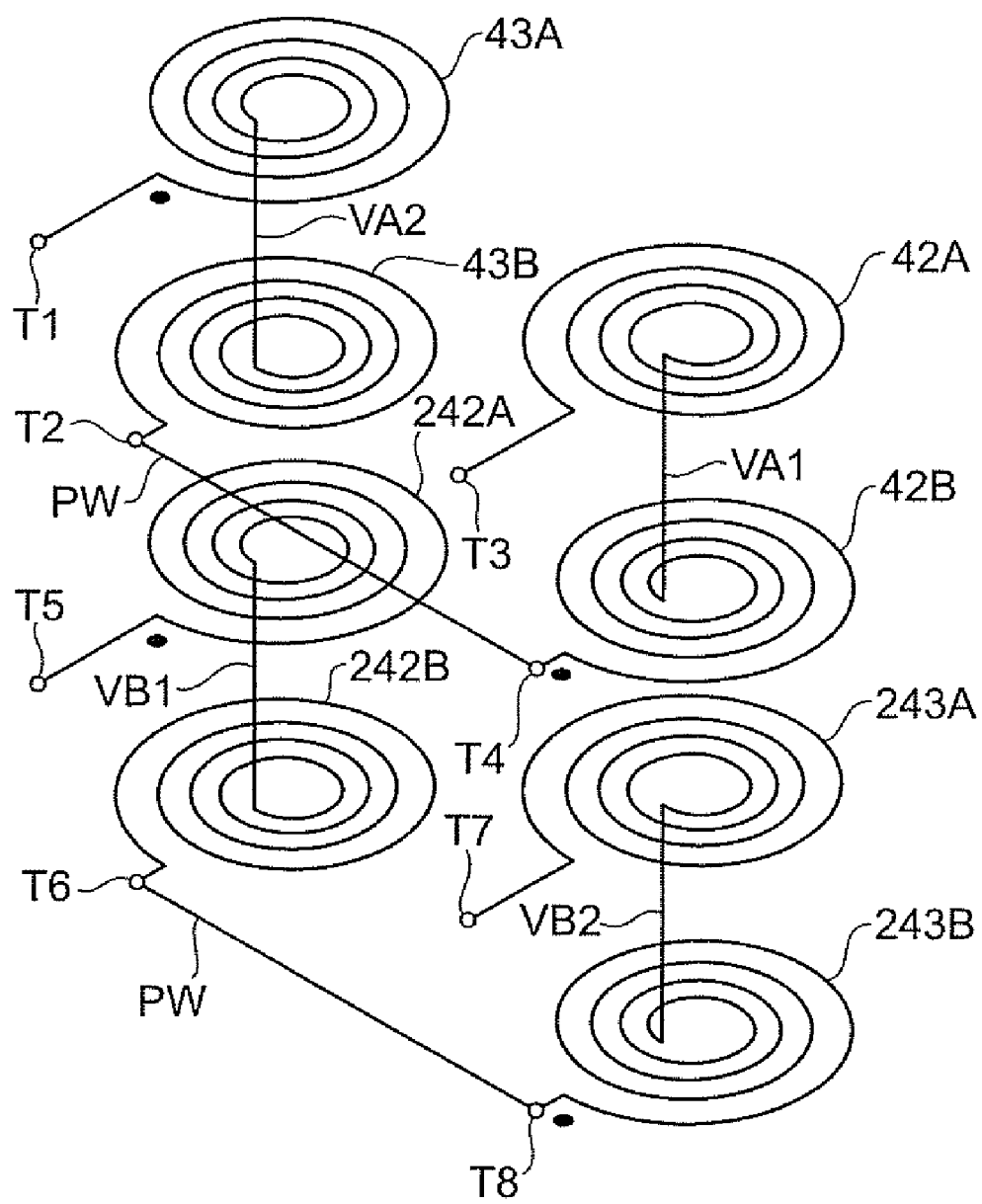
FIG. 9 is a diagram illustrating a wire connection of the primary side coils of the circuit illustrated in FIG. 3.

FIG. 9 is a diagram illustrating a wire connection of the primary side coils of the circuit illustrated in FIG. 3. This wire connection can be applied also to the structure illustrated in FIG. 7.

This wire connection differs from that illustrated in FIG. 8 in that the winding direction of the coils 42A, 42B, 243A, 243B in the right-hand sequence in the figure is different. Also, the points at which the terminal T2 is connected to the terminal T4 and the terminal T6 is connected to the terminal T8 are different from those described above. Otherwise, the configuration is the same as that illustrated in FIG. 8.

Figure 10A:
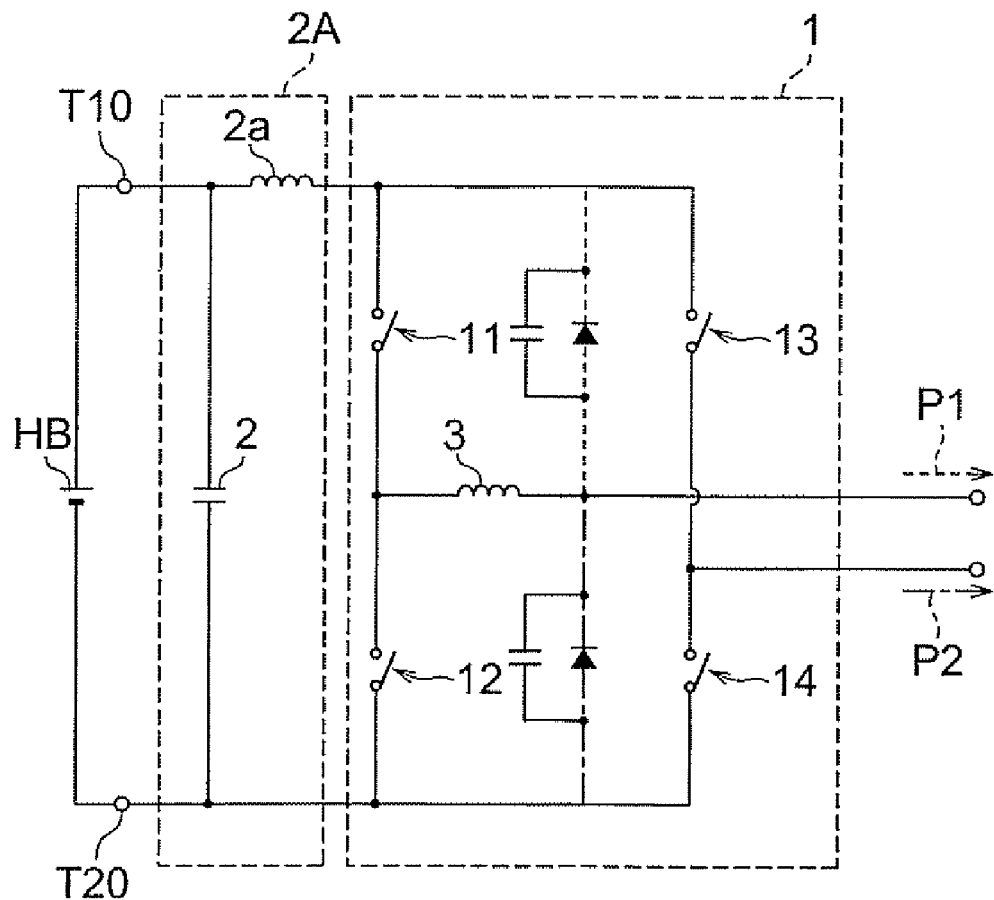
FIG. 10A is a circuit diagram of an inverter circuit 1.

FIG. 10A is a circuit diagram of the inverter circuit 1. Switching elements 11, 12, which are connected in series, connect supply lines. Switching elements 13, 14, which are connected in series, connect also supply lines. When the switching elements 11, 14 are switched on, current flowing through the current path P1 flows from the high-voltage side supply line, via the switching element 11, and a resonance inductor 3, out into the primary side coil, and flows to the low-voltage side supply line via the switching element 14. When the switching elements 13, 12 are switched on, current flowing through the current path P2 flows from the high-voltage side supply line, via the switching element 13, out into the primary side coil, and flows to the low-voltage side supply line via the resonance inductor 3 and the switching element 12. A diode and a capacitor may be inserted, in the opposite direction to the supply voltage, on the output side of the resonance inductor 3, as illustrated in FIG. 10A.

A capacitor 2 for input smoothing and a current transformer 2A for current detection are provided at the input parts T10, T20 connected to the supply HB of the inverter circuit 1.

Figure 10B:
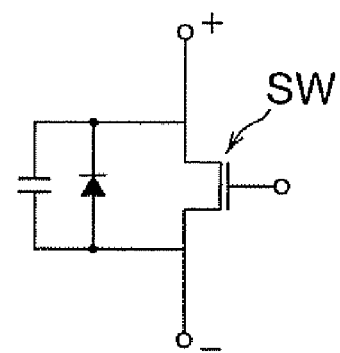
FIG. 10B is circuit diagram of a switching element.

The switching elements 11, 12, 13, 14 can comprise a field effect transistor SW as illustrated in FIG. 10B. The field effect transistor is provided with a parasitic capacitance and a parasitic diode.

In the above-described DC/DC converter, plural coils are formed on the same substrate, which is advantageous in that few terminals are needed.

Figure 11A:
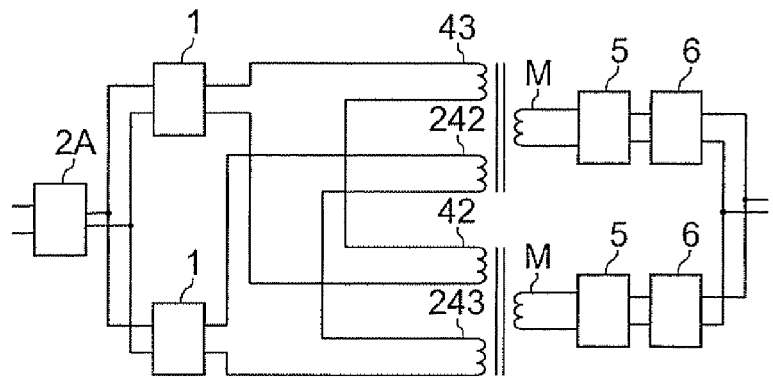
FIG. 11A is a block diagram illustrating an example of a DC/DC converter.
Figure 11B:
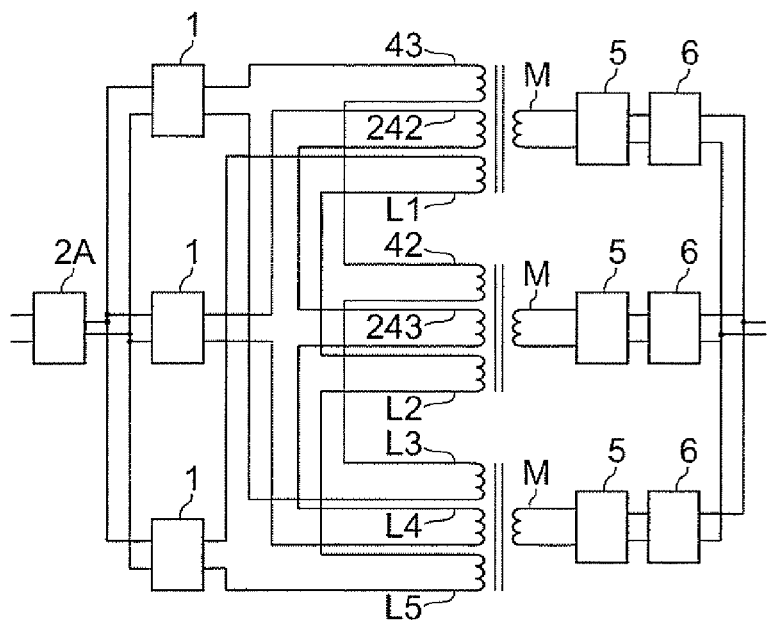
FIG. 11B is a block diagram illustrating an example of a DC/DC converter.
Figure 11C:
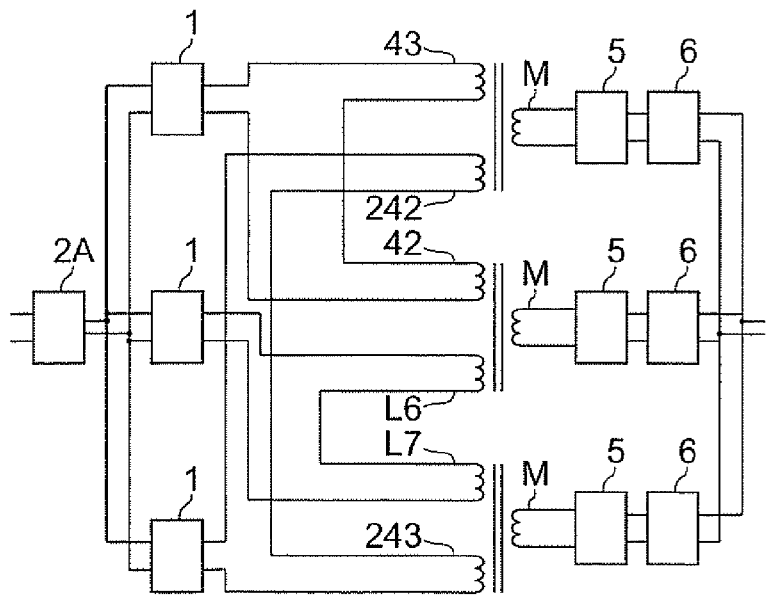
FIG. 11C is a block diagram illustrating an example of a DC/DC converter.

FIGS. 11A to 11C are block diagrams illustrating examples of DC/DC converters that can be constructed using a stacked structure such as the one illustrated in FIG. 7.

FIG. 11A is a diagram illustrating schematically the circuit of FIG. 1. In FIG. 11A the secondary side coils magnetically coupled to the primary side coils 43, 242, 42, 243 are denoted collectively as M.

FIG. 11B is a diagram illustrating schematically the circuits of a modified connection, in which the primary side coils 43, 242, L1 are provided on a first transformer, the primary side coils 42, 243, L2 are provided on a second transformer, and primary side coils L3, L4, L5 are provided on a third transformer. The primary side coils 43, 42, L3 are connected to a first inverter circuit 1, the primary side coils 242, 243, L4 are connected to a second inverter circuit 1, and the primary side coils L1, L2, L5 are connected to a third inverter circuit 1.

FIG. 11C is a diagram illustrating schematically the circuit of a modified connection, in which the primary side coils 43, 242 are provided on a first transformer, the primary side coils 42, L6 are provided on a second transformer, and the primary side coils L7, 243 are provided on a third transformer. The primary side coils 43, 42 are connected to a first inverter circuit 1, the primary side coils L6, L7 are connected to a second inverter circuit 1, and the primary side coils 242, 243 are connected to a third inverter circuit 1.

The operation of the coils in the upper-stage coil group areas G1, G2 are explained next with reference to the circuit illustrated in FIG. 1 and an equivalent circuit thereof. The same operation is carried out in the lower-stage coil group areas G3, G4.

Figure 12:
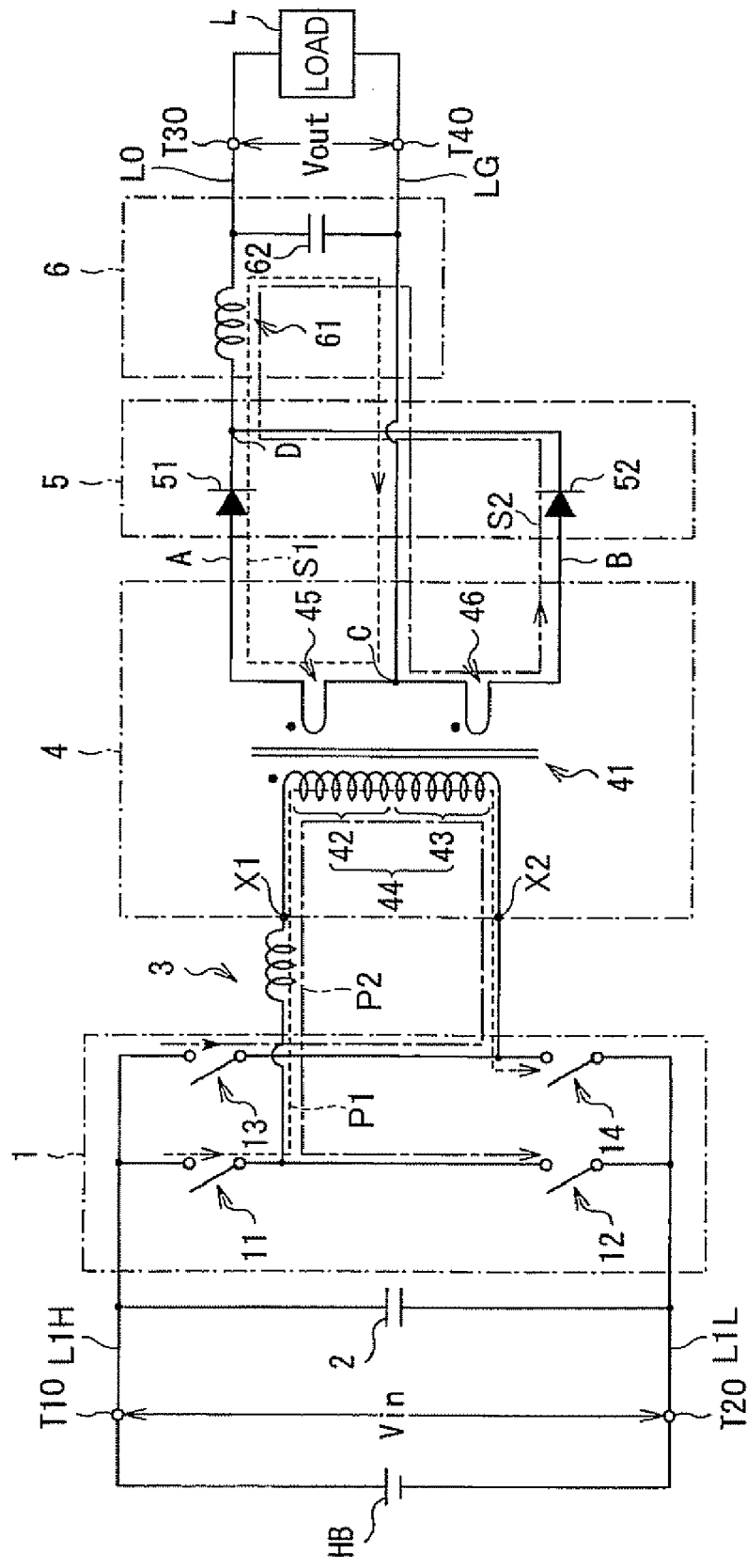
FIG. 12 is a circuit diagram of a DC/DC converter according to an embodiment.
Figure 13:
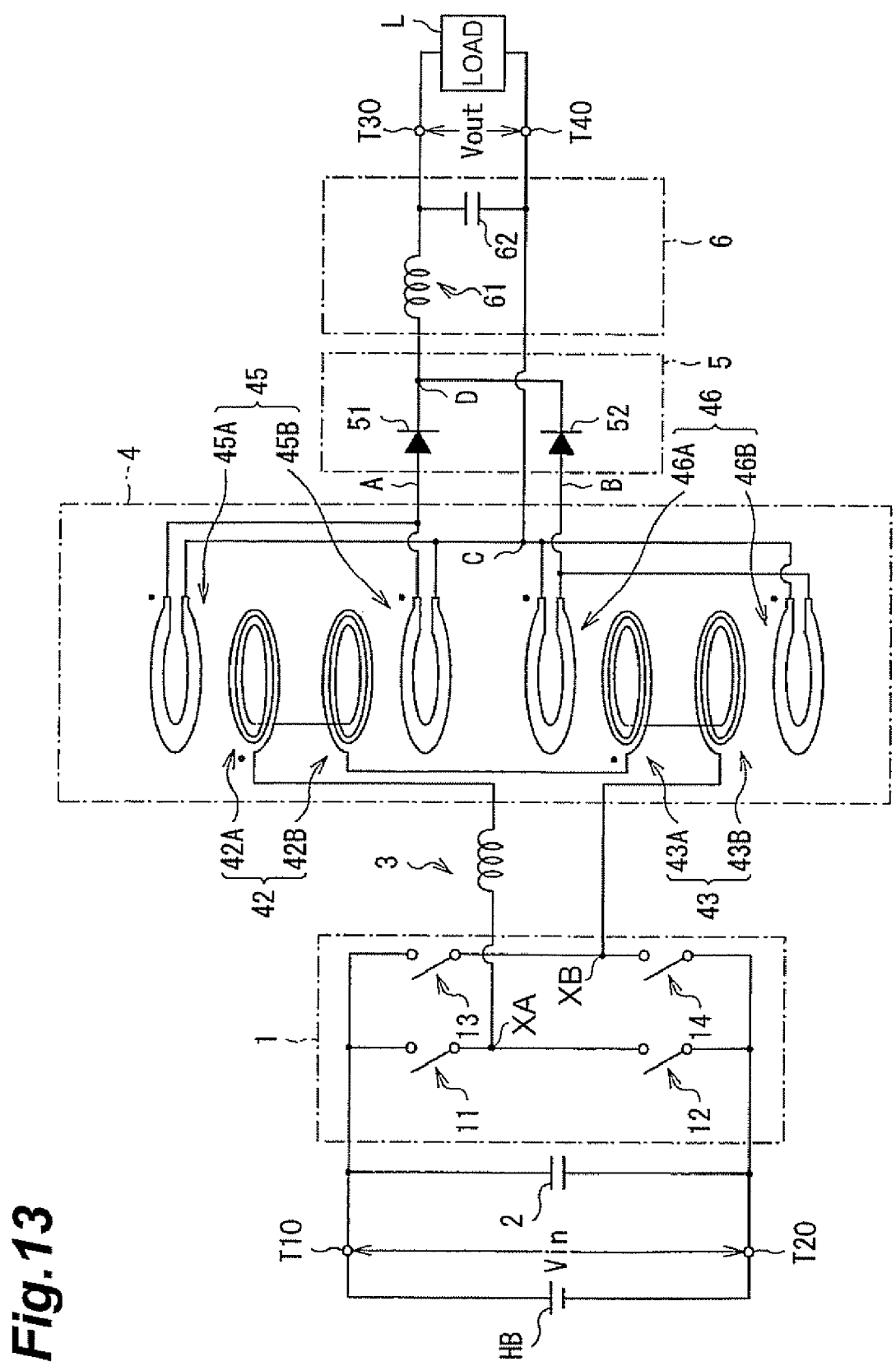
FIG. 13 is a structure diagram of a DC/DC converter.

FIG. 12 is a circuit diagram of such a DC/DC converter. FIG. 13 illustrates the expanded structure of a transformer in the DC/DC converter of FIG. 12. The transformer 4 below designates the transformer connected to the upper-stage coil group areas G1, G2. This DC/DC converter functions as a DC/DC converter for supplying converted voltage to a load L, by converting a high-voltage DC input voltage Vin, supplied from the supply HB comprising a high voltage battery, into a lower DC output voltage Vout. The secondary side is a center tap-type DC/DC converter.

The DC/DC converter comprises the inverter circuit 1 (switching circuit) and a smoothing capacitor 2 provided between a primary side high-voltage supply line L1H and a primary side low-voltage supply line L1L; a transformer 4 made up of a primary side coil 44 comprising the primary side coil 42 and the primary side coil 43 mutually connected in series, and a secondary side coil 47 comprising the secondary side coil 45 and the secondary side coil 46 mutually connected in series; and the resonance coil (inductor) 3 provided between the inverter circuit 1 and the transformer 4. The coils may comprise windings. The input terminal T10 is connected to the primary side high-voltage supply line L1H, and the input terminal T20 is connected to the primary side low-voltage supply line L1L. The input parts T10, T20 are connected to the output terminals of the supply HB.

The output part T30 is provided at an output line L0, which is a high-voltage side line of the smoothing circuit 6, while the output part T40 is provided at a ground line LG, which is a low-voltage side line of the smoothing circuit 6. The output parts T30, T40 are connected to the I/O terminals of the load L.

The inverter circuit 1 is a single-phase inverter circuit that converts DC input voltage Vin outputted from the supply HB into single-phase AC voltage having a substantially rectangular waveform. The inverter circuit 1 is a full bridge-type switching circuit in which the four switching elements 11, 12, 13, 14, respectively driven based on switching signals supplied from a control circuit (not shown), are connected in a full bridge configuration. As the switching elements there can be used, for instance, elements such as MOSFETs (metal oxide semiconductor-field effect transistors), IGBTs (insulated gate bipolar transistors) or the like.

The switching element 11 is provided between one end of the resonance inductor 3 and the primary side high-voltage supply line L1H, the switching element 12 is provided between one end of the resonance inductor 3 and the primary side low-voltage supply line L1L, the switching element 13 is provided between one end of the primary side coil 43 of the transformer 4 and the primary side high-voltage supply line L1H, and the switching element 14 is provided between one end of the primary side coil 43 and the primary side low-voltage supply line L1L.

As a result, an ON operation of the switching elements 11, 14 in the inverter circuit 1 causes current to flow through the first current path P1 from the primary side high-voltage supply line L1H to the primary side low-voltage supply line L1L via the switching element 11, the resonance inductor 3, the primary side coil 42, the primary side coil 43 and the switching element 14, in this order, while an ON operation of the switching elements 12, 13 causes current to flow through the second current path P2 from the primary side high-voltage supply line L1H to the primary side low-voltage supply line L1L via the switching element 13, the primary side coil 43, the primary side coil 42, the resonance inductor 3 and the switching element 12, in this order.

The resonance inductor 3 forms a resonance circuit together with at least one parasitic capacitance of the switching elements 11, 12, 13, 14. Power loss upon switching on and off of the switching elements is reduced by way of such resonance characteristic. The resonance inductor 3 may comprise actually an arrangement of coil components, but it may be constructed instead (or concomitantly therewith) using a series inductance comprising, for instance, wiring and/or a leakage inductance of the transformer 4.

The transformer 4 is a magnetic element in which a primary side coil 44 (primary side coil group), comprising the primary side coil 42 (primary side first coil group) and the primary side coil 43 (primary side second coil group) mutually connected in series, and a secondary side coil 47 (secondary side coil group), comprising the secondary side coil 45 (secondary side first coil group) and the secondary side coil 46 (secondary side second coil group) mutually connected in series, are magnetically coupled through winding around a magnetic core 41, in such a way so as to have polarities of mutually identical orientation. The transformer 4 is a step down-type transformer such that the respective number of turns of the secondary side coil 45 and the secondary side coil 46 is smaller than that of the primary side coil 44. The step down ratio is determined as the ratio between the number of turns of the primary side coil 44 and the respective number of turns of the secondary side coil 45 and the secondary side coil 46.

The secondary side coil 45 has a secondary side coil 45A (secondary side first sub-coil group) and a secondary side coil 45B (secondary side second sub-coil group) mutually connected in parallel. The secondary side coil 46 has a secondary side coil 46A (secondary side third sub-coil group) and a secondary side coil 46B (secondary side fourth sub-coil group) mutually connected in parallel. The secondary side coil 45A, the secondary side coil 45B, the secondary side coil 46A and the secondary side coil 46B are wound around the magnetic core 41.

One end of the secondary side coil 45 is connected to the anode of the diode 51, while the other end of the secondary side coil 45 is connected to a center tap (terminal) C. Meanwhile, one end of the secondary side coil 46 is connected to the anode of the below-described diode 52, while the other end of the secondary side coil 46 is connected to the center tap C. The center tap C is connected to the output part T40 via the ground line LG. That is, the secondary side of the transformer 4 is connected in a center tap configuration. The secondary side coil 45 and the secondary side coil 46 are driven with mutually opposite phases in time division by the rectifier circuit 5.

The primary side coil 42 has the primary side coil 42A (primary side first sub-coil group) and the primary side coil 42B (primary side second sub-coil group) mutually connected in series. The primary side coil 42A and the primary side coil 42B are wound three times around the magnetic core 41. The primary side coil 42 is sandwiched between the secondary side coil 45A and the secondary side coil 45B. The primary side coil 42A is arranged in the vicinity of the secondary side coil 45A, while the primary side coil 42B is arranged in the vicinity of the secondary side coil 45B. The primary side coil 42 is arranged thereby closer to the secondary side coil 45 than to the secondary side coil 46.

The primary side coil 43 has the primary side coil 43A (primary side third sub-coil group) and the primary side coil 43B (primary side fourth sub-coil group) mutually connected in series. The primary side coil 43A and the primary side coil 43B are wound three times around the magnetic core 41. The primary side coil 43 is sandwiched between the secondary side coil 46A and the secondary side coil 46B. The primary side coil 43A is arranged adjacent to the secondary side coil 46A, while the primary side coil 43B is arranged adjacent to the secondary side coil 46B. The primary side coil 43 is arranged thereby closer to the secondary side coil 46 than to the secondary side coil 45.

As a result, the transformer 4 has a structure in which the primary side coils (primary side coils 42, 43) and the secondary side coils (secondary side coils 45, 46) are stacked (sandwich-like) alternately, such that the primary side coil 42 and the primary side coil 43, through which current flows in the same direction, are not close to each other along the same axis. In the transformer 4, the secondary side coil 45A (secondary side first sub-coil group), the primary side coil 42A (primary side first sub-coil group), the primary side coil 42B (primary side second sub-coil group), the secondary side coil 45B (secondary side second sub-coil group), the secondary side coil 46A (secondary side third sub-coil group), the primary side coil 43A (primary side third sub-coil group), the primary side coil 43B (primary side fourth sub-coil group) and the secondary side coil 46B (secondary side fourth sub-coil group) are arranged stacked in this order along a one-directional loop of the magnetic circuit. The stacked structure of the transformer 4 is symmetrical along the loop.

The primary side coil 42 and the primary side coil 43 are connected to the inverter circuit 1 such that the direction in which the current flows through them changes in accordance with the operation of the inverter circuit 1. Specifically, one end of the primary side coil 42 is connected, via the resonance inductor 3, to a connection point XA between the switching element 11 and the switching element 12. The other end of the primary side coil 42 is connected to one end of the primary side coil 43. The other end of the primary side coil 43 is connected to a connection point XB between the switching element 13 and the switching element 14.

The primary side coil 42A, the primary side coil 42B, the primary side coil 43A, the primary side coil 43B, the secondary side coil 45, the secondary side coil 45B, the secondary side coil 46A and the secondary side coil 46B may be mutually insulated by air, or by being sandwiched between insulating sheets not shown.

Figure 14:
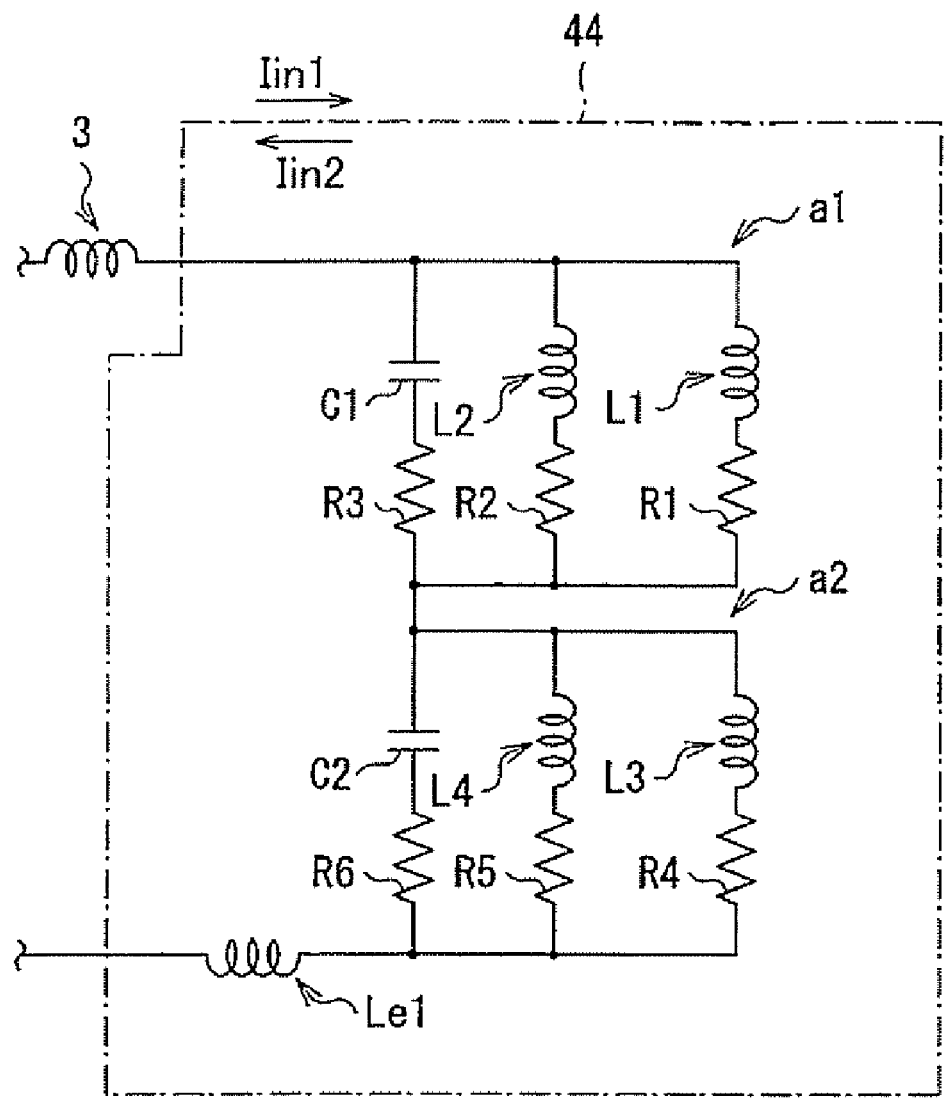
FIG. 14 is an equivalent circuit diagram of primary side coils of a transformer.

The primary side coil 44, comprising the primary side coil 42 and the primary side coil 43, can be represented by an equivalent circuit such as the one illustrated in FIG. 14. Specifically, such an equivalent circuit is a circuit in which a circuit a1, a circuit a2 and an inductance Le1 are mutually connected in series. The circuit a1 comprises an inductance L1 and a resistor R1 mutually connected in series, an inductance L2 and a resistor R2 mutually connected in series, and a line capacitance C1 and a resistor R3 mutually connected in parallel. The circuit a2 comprises an inductance L3 and a resistor R4 mutually connected in series, an inductance L4 and a resistor R5 mutually connected in series, and a line capacitance C2 and a resistor R6 mutually connected in parallel.

The inductance L1 is the inductance of the primary side coil 42 when the transformer 4 behaves as an ideal transformer, and the resistor R1 is the resistance of the primary side coil 42 when the transformer 4 behaves as an ideal transformer. The inductance L2 is an excitation inductance of the primary side coil 42, and the resistor R2 is an AC resistance component of the primary side coil 42. The line capacitance C1 is the total sum capacitance of the line capacitance within the primary side coil 42 and the line capacitance of the primary side coil 42 and the secondary side coils 45, 46. The resistor R3 is the AC resistance component of the primary side coil 42. The inductance L3 is the inductance of the primary side coil 43 when the transformer 4 behaves as an ideal transformer, and the resistor R4 is the resistance of the primary side coil 43 when the transformer 4 behaves as an ideal transformer. The inductance L4 is an excitation inductance of the primary side coil 43, and the resistor R5 is an AC resistance component of the primary side coil 43. The line capacitance C2 is the total sum capacitance of the line capacitance within the primary side coil 43 and the line capacitance of the primary side coil 43 and the secondary side coils 45, 46. The resistor R6 is the AC resistance component of the primary side coil 43. The inductance Le1 is a leakage inductance of the transformer 4.

The rectifier circuit 5 is a single-phase full-wave rectifier circuit comprising a pair of the diode 51 (first rectifier element) and the diode 52 (second rectifier element). The anode of the diode 51 is connected to one end of the secondary side coil 45, while the cathode of the diode 51 is connected to a connection point D. The anode of the diode 52 is connected to one end of the secondary side coil 46, while the cathode of the diode 52 is connected to the connection point D. The connection point D is connected to the output part T30 via the smoothing circuit 6. As a result, the rectifier circuit 5 is driven with mutually opposite phases in time division by the secondary side coil 45 and the secondary side coil 46.

The smoothing circuit 6 comprises a choke coil 61 and a smoothing capacitor 62. The DC output voltage Vout, which is generated through smoothing of DC voltage rectified by the rectifier circuit 5, is supplied from the output parts T30, T40 to the load L.

The operation of the DC/DC converter having the above configuration is explained next. The explanation relates to driving of the inverter circuit 1 during a normal switching operation. The inverter circuit 1, however, can also be driven, for instance, with zero-volt switching control.

When the switching elements 11, 14 of the inverter circuit 1 are switched on, current flows from the switching element 11 toward the switching element 14, whereupon a voltage Vin1 is generated at the primary side coil 44 of the transformer 4, and a current Iin1 flows through the primary side coil 42 and the primary side coil 43 constituting the primary side coil 44. In the secondary side coils 45, 46 of the transformer 4, meanwhile, there is generated a voltage in the reverse direction of the diode 52 and the forward direction of the diode 51. As a result, current Iout1 flows to the output line LO and the ground line LG, via the secondary side coil 45, the diode 51, the choke coil 61 and the smoothing capacitor 62. The voltage Vout, smoothed by the smoothing circuit 6, is outputted then at the output parts T30 and T40 connected in parallel to the smoothing circuit 62.

When the switching elements 11, 14 are next switched from on to off, a voltage in the forward direction of the diode 52 forms in the secondary side coils 45, 46 of the transformer 4. As a result, current flows to the output line LO and the ground line LG, via the secondary side coil 46, the diode 52, the choke coil 61 and the smoothing capacitor 62. The voltage Vout, smoothed by the smoothing circuit 6, is outputted then at the output parts T30 and T40 connected in parallel to the smoothing circuit 62.

Next, when the switching elements 12, 13 are switched on, current flows from the switching element 13 toward the switching element 12, whereupon a voltage Vin2 is generated at the primary side coil 44 of the transformer 4, and a current Iin2 flows through the primary side coil 42 and the primary side coil 43 constituting the primary side coil 44. In the secondary side coils 45, 46 of the transformer 4, meanwhile, there is generated a voltage in the forward direction of the diode 52 and the reverse direction of the diode 51. As a result, current Iout2 flows to the output line LO and the ground line LG, via the secondary side coil 46, the diode 52, the choke coil 61 and the smoothing capacitor 62. The voltage Vout, smoothed by the smoothing circuit 6, is outputted then at the output parts T30 and T40 connected in parallel to the smoothing capacitor 62.

Lastly, when the switching elements 12, 13 are next switched from on to off, a voltage in the forward direction of the diode 51 forms in the secondary side coils 45, 46 of the transformer 4. As a result, current flows to the output line LO and the ground line LG, via the secondary side coil 45, the diode 51, the choke coil 61 and the smoothing capacitor 62. The voltage Vout, smoothed by the smoothing circuit 6, is outputted then at the output parts T30 and T40 connected in parallel to the smoothing capacitor 62.

Thus, the DC/DC converter converts (steps down) DC input voltage Vin supplied from a high-voltage battery into DC output voltage Vout, and supplies the converted DC output voltage Vout to a low-voltage battery.

The effect of the DC/DC converter of the present embodiment is explained next with reference to a comparative example.

Figure 15:
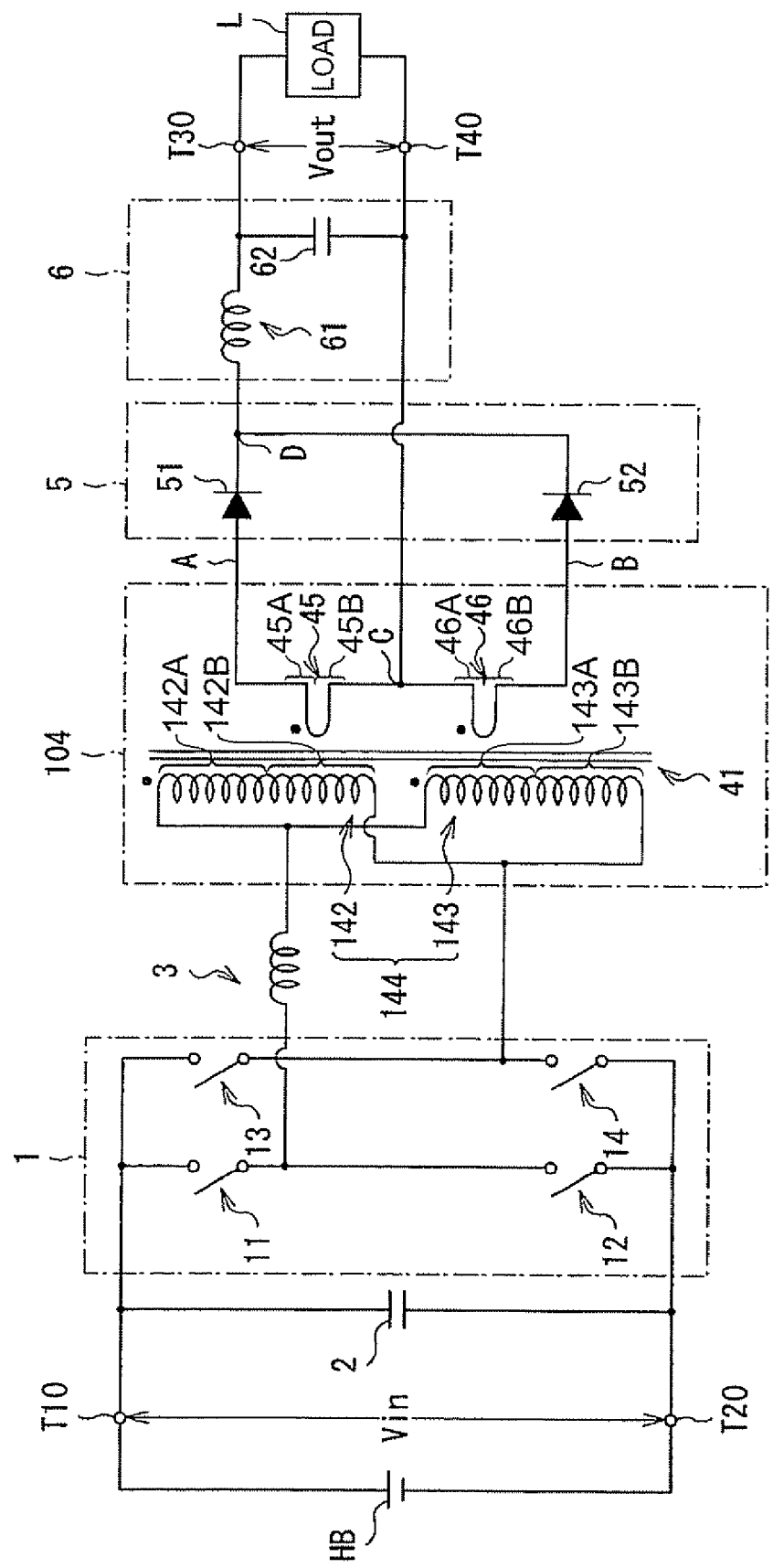
FIG. 15 is a circuit diagram of a DC/DC converter according to a comparative example.

As shown in FIG. 15, the comparative example differs from the embodiment in that a primary side coil 144 of a transformer 104 comprises a primary side coil 142 and a primary side coil 145 mutually connected in parallel.

Similarly to the primary side coil 42 of the embodiment, the primary side coil 142 of the comparative example has a primary side coil 142A and a primary side coil 142B mutually connected in series. The primary side coil 142A and the primary side coil 142B are arranged sequentially stacked from the top down, being wound six times around the magnetic core 41. With a view to matching the step down ratio between the embodiment and the comparative example, the number of turns of the primary side coil 142 is 12 turns, i.e. double the number of turns of the primary side coil 42. The primary side coil 142 is sandwiched between the secondary side coil 45A and the secondary side coil 45B. The primary side coil 142A is arranged in the vicinity of the secondary side coil 45A, while the primary side coil 142B is arranged in the vicinity of the secondary side coil 45B. The primary side coil 142 is arranged thereby closer to the secondary side coil 45 than to the secondary side coil 46.

The primary side coil 143 of the comparative example has a primary side coil 143A and a primary side coil 143B mutually connected in series. The primary side coil 143A and the primary side coil 143B are arranged sequentially stacked from the top down, being wound three times around the magnetic core 41. With a view to matching the step down ratio between the embodiment and the comparative example, the number of turns of the primary side coil 143 is 12 turns, i.e. double the number of turns of the primary side coil 43. The primary side coil 143 is sandwiched between the secondary side coil 46A and the secondary side coil 46B. The primary side coil 143A is arranged adjacent to the secondary side coil 46A, while the primary side coil 143B is arranged adjacent to the secondary side coil 46B. The primary side coil 143 is arranged thereby closer to the secondary side coil 46 than to the secondary side coil 45.

Figure 16:
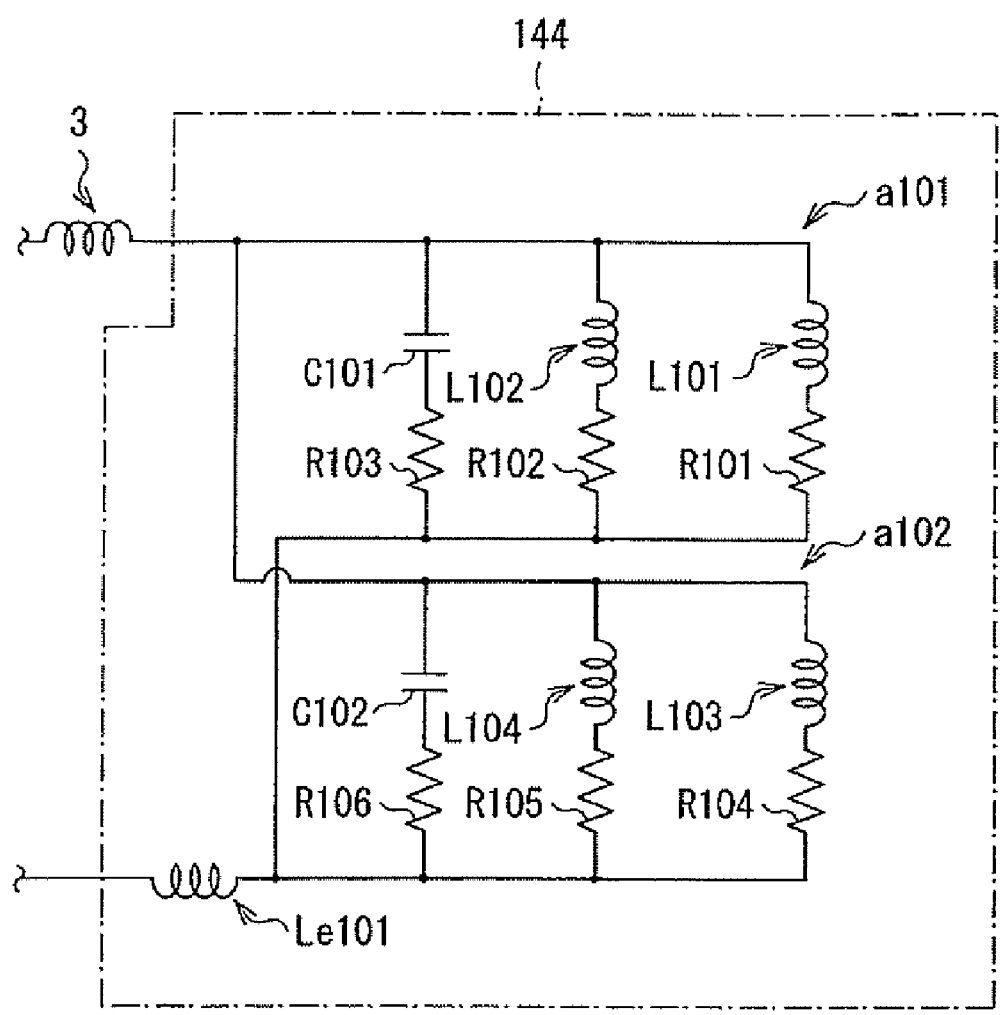
FIG. 16 is an equivalent circuit diagram of primary side coils of a transformer.

The primary side coils of the transformer 104 of the comparative example, i.e. the primary side coil 144 comprising the primary side coil 142 and the primary side coil 143, can be represented by an equivalent circuit such as the one illustrated in FIG. 16. Specifically, such an equivalent circuit comprises a circuit in which a circuit a101 and a circuit a102 are mutually connected in parallel, and an inductance Le 101 connected in series thereto. The circuit a101 comprises an inductance L101 and a resistor R101 mutually connected in series, an inductance L102 and a resistor R102 mutually connected in series, and a line capacitance C101 and a resistor R103 mutually connected in parallel. The circuit a102 comprises an inductance L103 and a resistor R104 mutually connected in series, an inductance L104 and a resistor R105 mutually connected in series, and a line capacitance C102 and a resistor R106 mutually connected in parallel.

The inductance L101 is the inductance of the primary side coil 142 when the transformer 104 behaves as an ideal transformer, and the resistor R101 is a resistance of the primary side coil 142 when the transformer 104 behaves as an ideal transformer. The inductance L102 is an excitation inductance of the primary side coil 142, and the resistor R102 is an AC resistance component of the primary side coil 142. The line capacitance C101 is the total sum capacitance of the line capacitance within the primary side coil 142 and the line capacitance of the primary side coil 142 and the secondary side coils 45, 46. The resistor R103 is the AC resistance component of the primary side coil 142. The inductance L103 is the inductance of the primary side coil 143 when the transformer 104 behaves as an ideal transformer, and the resistor R104 is a resistance of the primary side coil 143 when the transformer 104 behaves as an ideal transformer. The inductance L104 is an excitation inductance of the primary side coil 143, and the resistor R105 is an AC resistance component of the primary side coil 143. The line capacitance C102 is the total sum capacitance of the line capacitance within the primary side coil 143 and the line capacitance of the primary side coil 143 and the secondary side coils 45, 46. The resistor R106 is an AC resistance component of the primary side coil 143. The inductance Le101 is a leakage inductance of the transformer 104.

Figure 17:
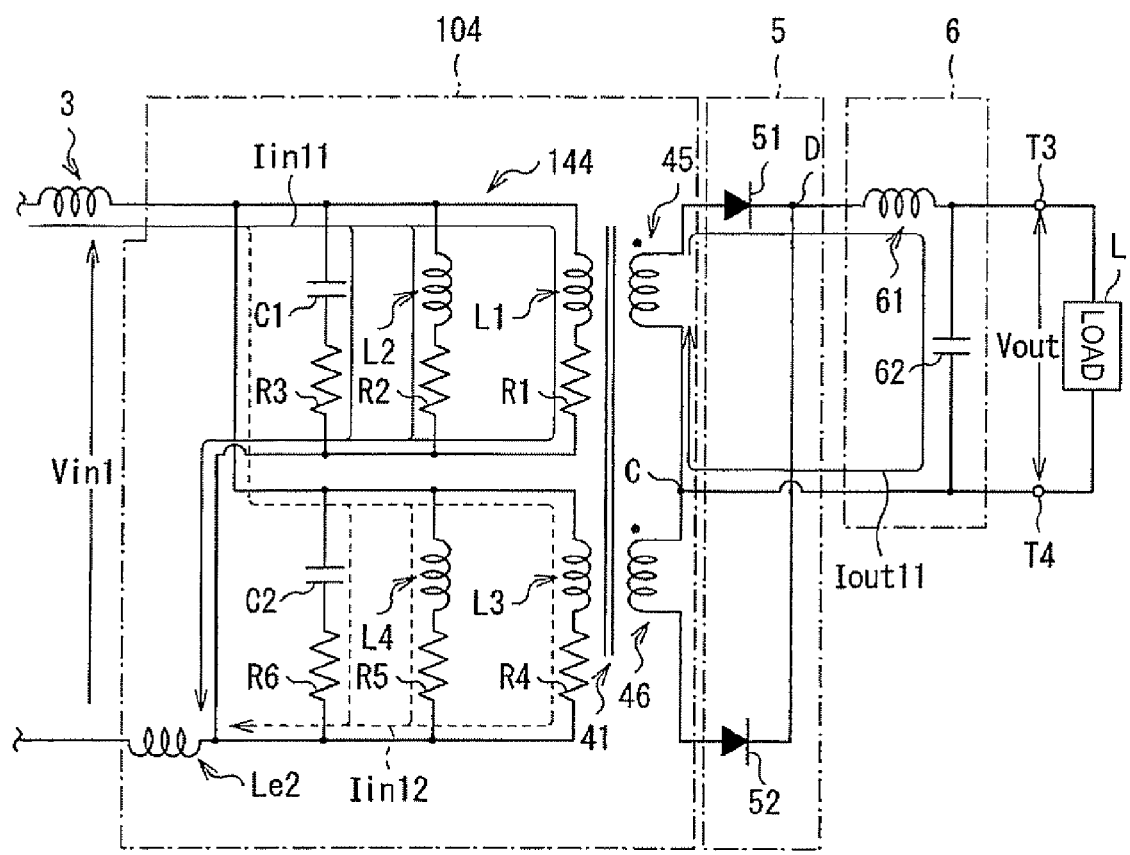
FIG. 17 is a circuit diagram for explaining the operation of a DC/DC converter.

In the comparative example, when the voltage Vin1 is inputted into the primary side coil 144, a current Iin11 flows through the primary side coil 142, and a current IIn12 flows through the primary side coil 143, as illustrated in FIG. 17. The primary side coil 142 is arranged closer to the secondary side coil 45, where current flows, becoming hence closely magnetically coupled with the secondary side coil 45. In accordance with the transformer principle, the orientation of the current flowing through the primary side coil 142 becomes then the opposite of the orientation of the current flowing through the secondary side coil 45. As a result, the influence of the proximity effect is reduced in the primary side coil 142, and hence AC resistance is reduced as compared with a case in which coil groups having the same current flow orientation are arranged close to each other. Consequently, a relatively larger current flows through the primary side coil 142. On the other hand, the primary side coil 143 is arranged further away from the secondary side coil 45, where current flows, becoming hence sparsely magnetically coupled with the secondary side coil 45. The primary side coil 143 is arranged herein relatively closer to the primary side coil 46, through which no current flows, and hence the AC resistance on account of the proximity effect becomes higher in the secondary side coil 143 than in the primary side coil 142. Thus, only a relatively small current flows through the primary side coil 143.

Figure 18:
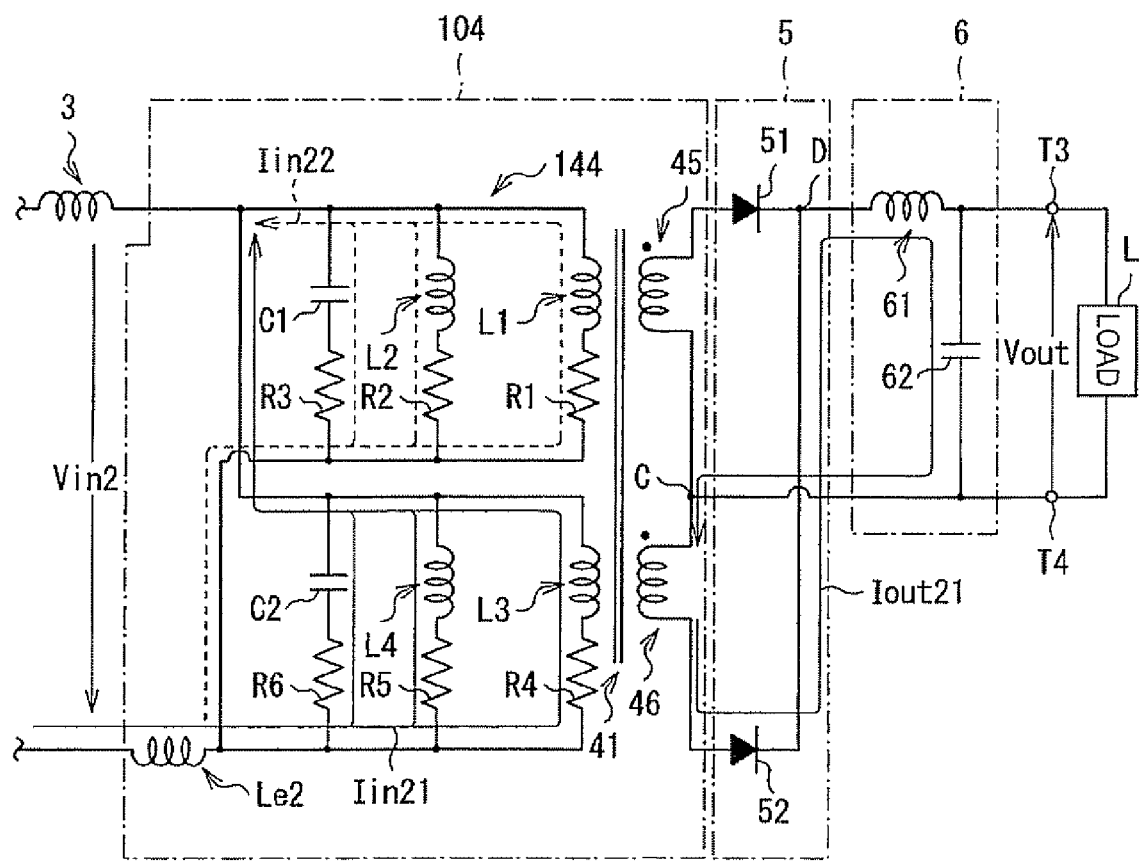
FIG. 18 is another circuit diagram for explaining the operation of a DC/DC converter.

When the voltage Vin2 is inputted into the primary side coil 144, a current Iin22 flows through the primary side coil 142, and a current IIn21 flows through the primary side coil 143, as illustrated in FIG. 18. The primary side coil 143 is arranged closer to the secondary side coil 46, where current flows, becoming hence magnetically coupled relatively more closely with the secondary side coil 46. In accordance with the transformer principle, the orientation of the current flowing through the primary side coil 143 becomes then the opposite of the orientation of the current flowing through the secondary side coil 46. As a result, the influence of the proximity effect is reduced in the primary side coil 143, and hence AC resistance is reduced as compared with a case in which coil groups having the same current flow orientation are arranged close to each other. Consequently, a relatively larger current flows through the primary side coil 143. On the other hand, the primary side coil 142 is arranged further away from the secondary side coil 46, where current flows, becoming hence magnetically coupled relatively sparsely with the secondary side coil 46. The primary side coil 142 is arranged herein relatively closer to the secondary side coil 45, through which no current flows, and hence the AC resistance on account of the proximity effect becomes higher in the primary side coil 142 than in the primary side coil 143. Thus, only a relatively small current flows through the primary side coil 142.

Figure 19:
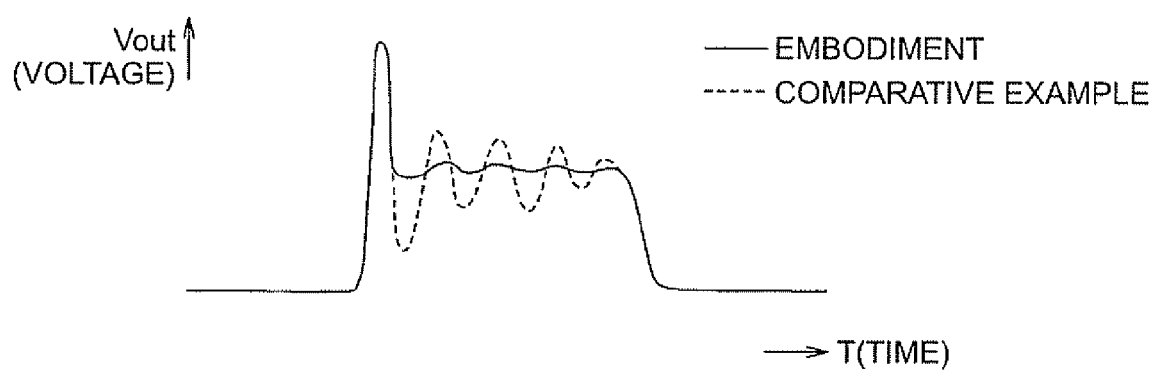
FIG. 19 is a circuit diagram of the waveform of output AC voltage of a transformer.

In the comparative example, thus, the primary side coil 142 and the primary side coil 143 are mutually connected in parallel, and hence more current flows in the coils on the side having low AC resistance. It becomes therefore virtually impossible to attenuate, by way of low AC resistance, the ringing that forms in the output AC voltage (voltage between ends A, B in FIG. 15) of the transformer 104 on account of the LC resonance arising from the line capacitances C1, C2 of the transformer 104, the excitation inductances L2 and L4 of the transformer 104, and the leakage inductance Le1 of the transformer 104 (see waveform denoted by the broken line in FIG. 19). Core loss in the transformer 104 and heat generation caused by AC resistance of the transformer 104 increase as a result, impairing the efficiency of the latter.

Figure 20:
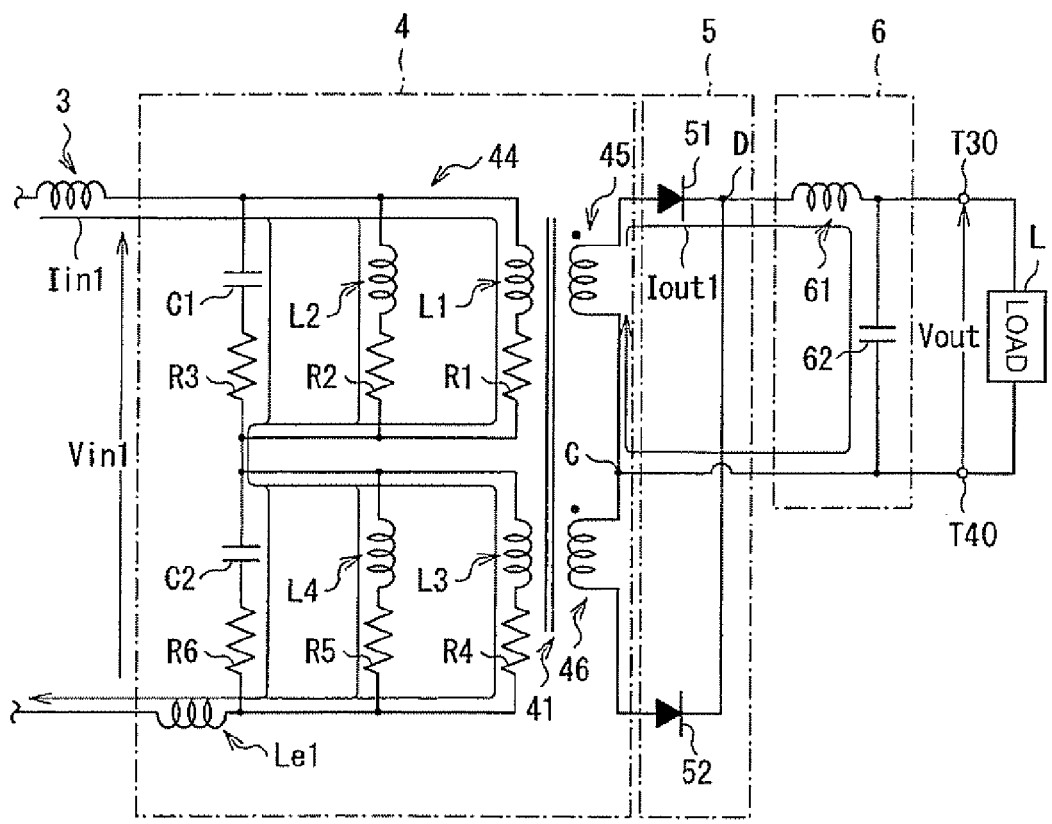
FIG. 20 is a circuit diagram for explaining the operation of a DC/DC converter.

In the embodiment, by contrast, when the voltage Vin1 is inputted into the primary side coil 44, the current Iin1 flows through the primary side coil 42 and the primary side coil 43 constituting the primary side coil 44, as illustrated in FIG. 20. The primary side coil 42 is arranged closer to the secondary side coil 45, where current flows, becoming hence magnetically coupled relatively more closely with the secondary side coil 45. In accordance with the transformer principle, the orientation of the current flowing through the primary side coil 42 becomes then the opposite of the orientation of the current flowing through the secondary side coil 45. As a result, the influence of the proximity effect is reduced in the primary side coil 42, and hence AC resistance is reduced as compared with a case in which coil groups having the same current flow orientation are arranged close to each other. On the other hand, the primary side coil 43 is arranged further away from the secondary side coil 45, where current flows, becoming hence magnetically coupled relatively sparsely with the secondary side coil 45. The primary side coil 43 is arranged herein relatively closer to the secondary side coil 46, through which no current flows, and hence the AC resistance on account of the proximity effect becomes higher in the primary side coil 43 than in the primary side coil 42. In the present embodiment, however, the primary side coil 42 and the primary side coil 43 are mutually connected in series, and hence mutually equal current flows through the primary side coil 42 and the primary side coil 43.

Figure 21:
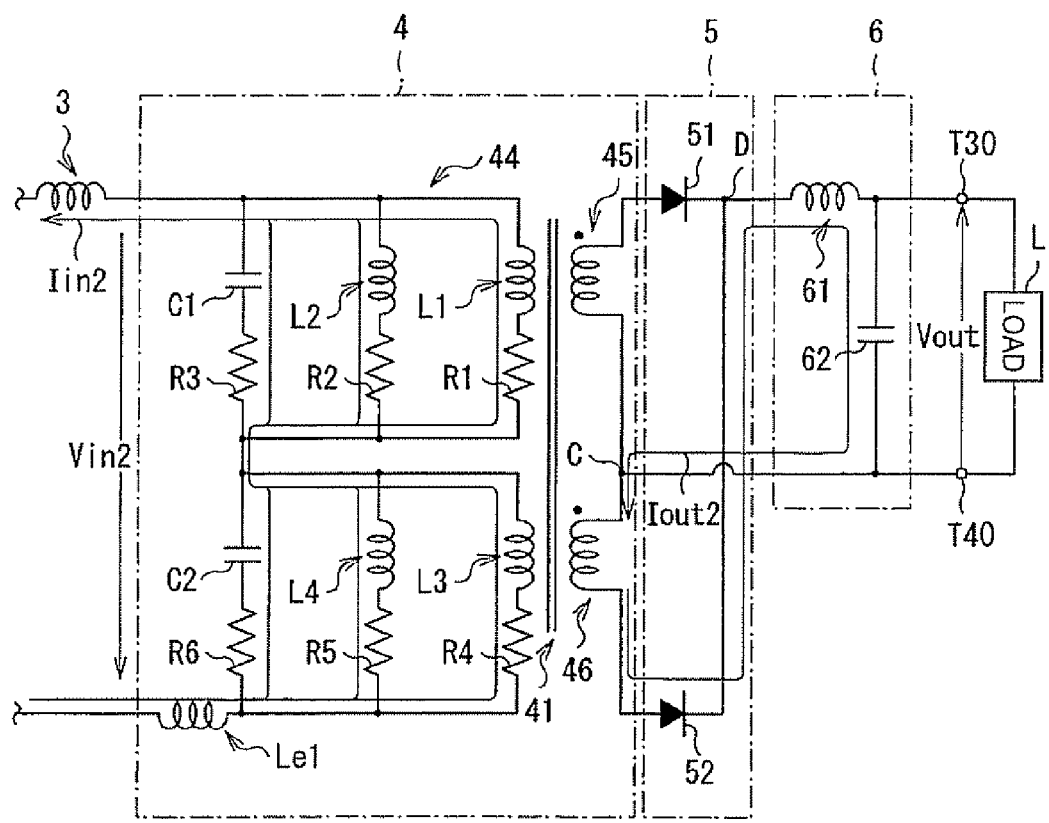
FIG. 21 is another circuit diagram for explaining the operation of a DC/DC converter.

Also, when the voltage Vin2 is inputted into the primary side coil 44, the current Iin2 flows through the primary side coil 42 and the primary side coil 43 constituting the primary side coil 44, as illustrated in FIG. 21. The primary side coil 43 is arranged closer to the secondary side coil 46, where current flows, becoming hence magnetically coupled relatively more closely with the secondary side coil 46. In accordance with the transformer principle, the orientation of the current flowing through the primary side coil 43 becomes then the opposite of the orientation of the current flowing through the secondary side coil 46. As a result, the influence of the proximity effect is reduced in the primary side coil 43, and hence AC resistance is reduced as compared with a case in which coil groups having the same current flow orientation are arranged close to each other On the other hand, the primary side coil 42 is arranged further away from the secondary side coil 46, where current flows, becoming hence magnetically coupled relatively sparsely with the secondary side coil 46. The primary side coil 42 is arranged herein relatively closer to the secondary side coil 45, through which no current flows, and hence the AC resistance on account of the proximity effect becomes higher in the primary side coil 42 than in the primary side coil 43. In the present embodiment, however, the primary side coil 42 and the primary side coil 43 are mutually connected in series, and hence mutually equal current flows through the primary side coil 42 and the primary side coil 43.

Since the primary side coil 42 and the primary side coil 43 are mutually connected in series in the present embodiment, substantial current flows thus also through coils having a large AC resistance. As a result, it becomes possible to attenuate, by way of high AC resistance, the ringing that forms in the output AC voltage (voltage between terminals A, B in FIG. 12) of the transformer 4 on account of the LC resonance arising from the line capacitances C1, and C2 of the transformer 4, the excitation inductances L2 and L4 of the transformer 4, and the leakage inductance Le1 of the transformer 4 (see waveform denoted by the solid line in FIG. 19). This reduces, therefore, core loss in the transformer 4 and heat generation caused by AC resistance of the transformer 4, enhancing thereby the efficiency of the latter.

In the present embodiment, the various coils of the transformer 4 (the primary side coil 42A, the primary side coil 42B, the primary side coil 43A, the primary side coil 43B, the secondary side coil 45A, the secondary side coil 45B, the secondary side coil 46A and the secondary side coil 46B) adopt a stacked structure having top-down symmetry. Accordingly, there arises essentially no difference in the magnitude of the AC resistance of the transformer 4 during driving of the secondary side coil 45 and during driving of the secondary side coil 46. As a result, there is essentially no difference in the amount of ringing attenuation in the output AC voltage during driving of the secondary side coil 45, and in the output AC voltage during driving of the secondary side coil 46. High efficiency can be maintained, therefore, without incurring periodic increases of the amount of released heat.

Figure 22:
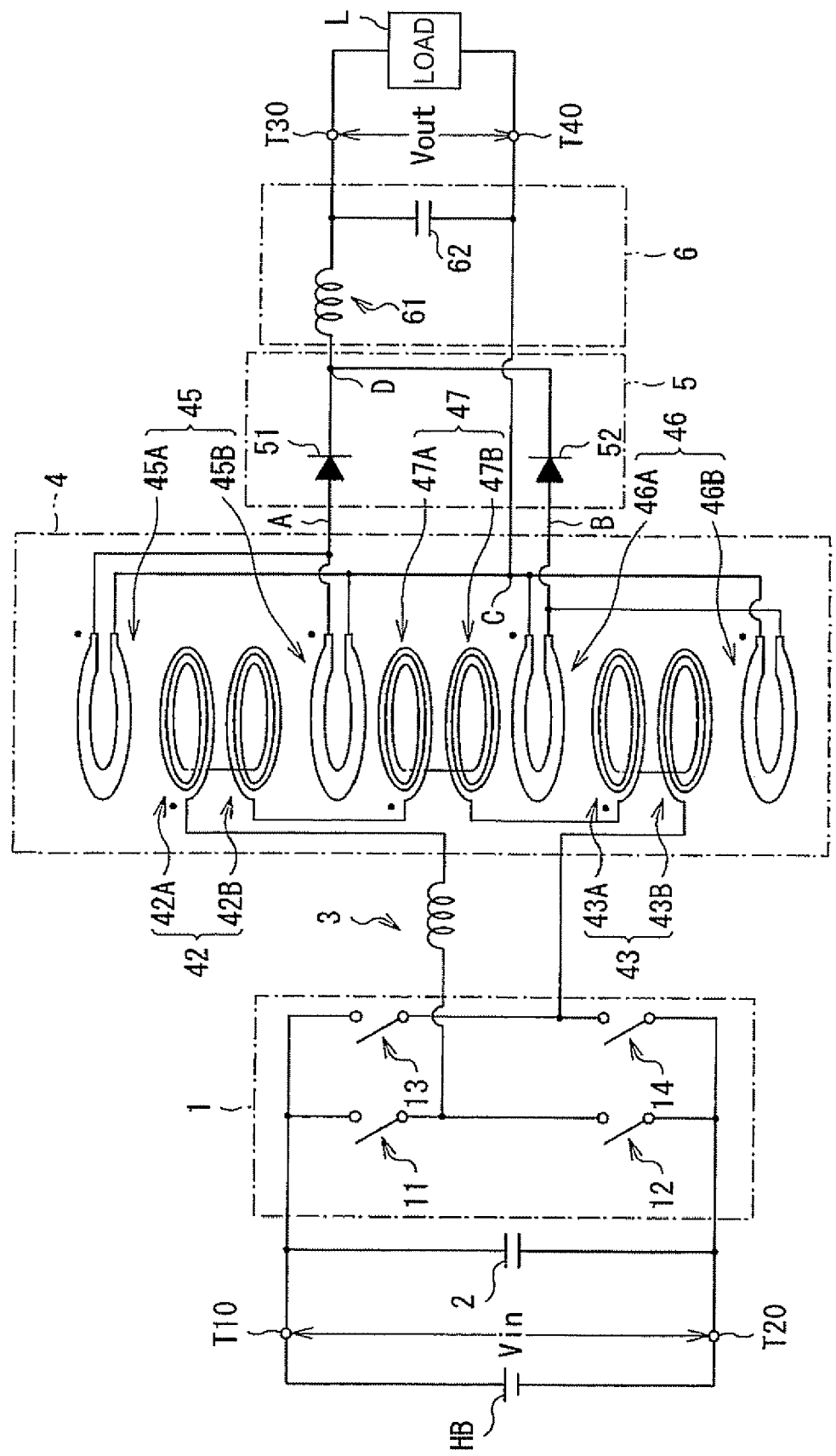
FIG. 22 is a circuit diagram of a DC/DC converter according to a modification.
Figure 23:
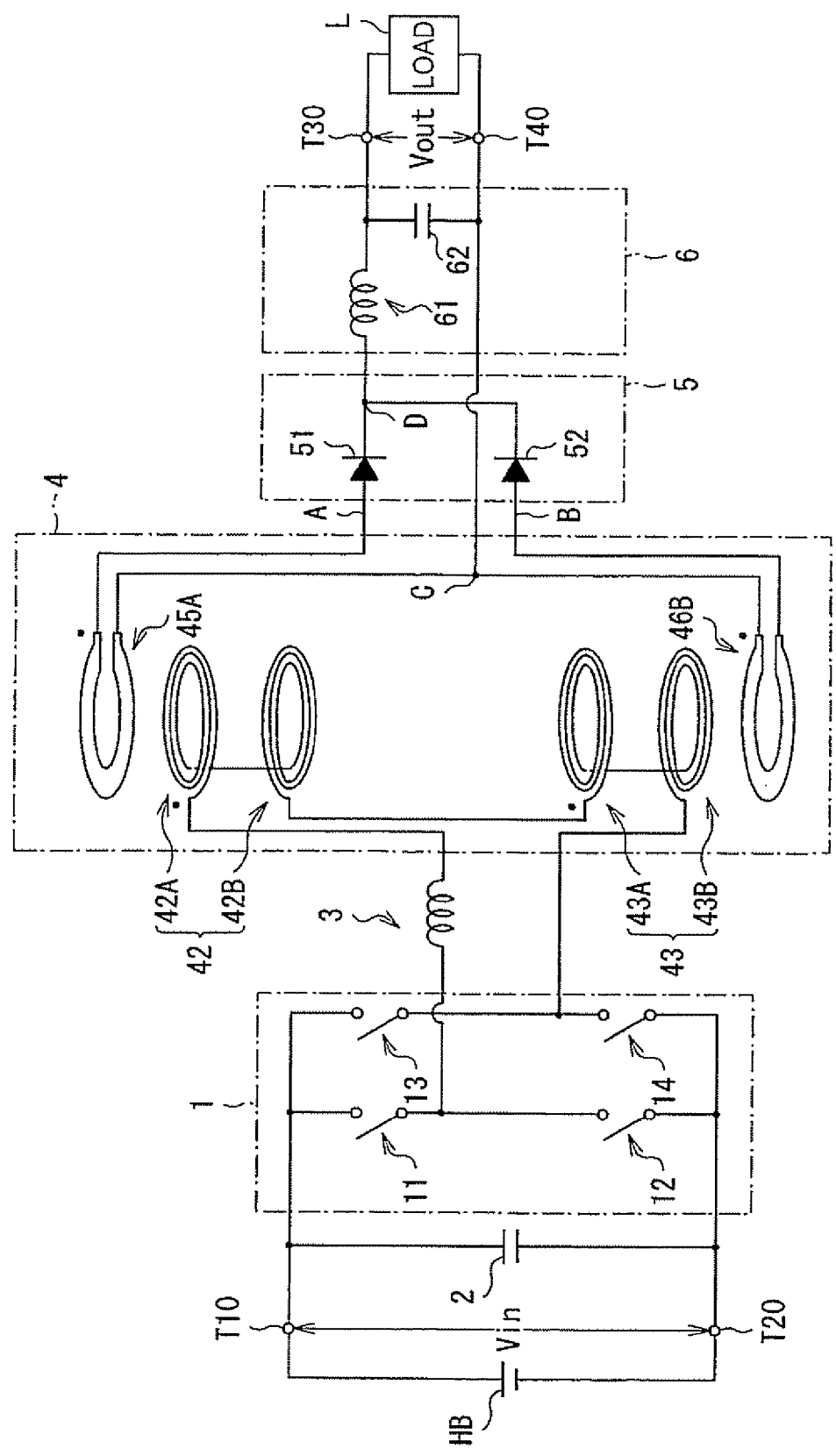
FIG. 23 is a circuit diagram of a DC/DC converter according to another modification.
Figure 24:
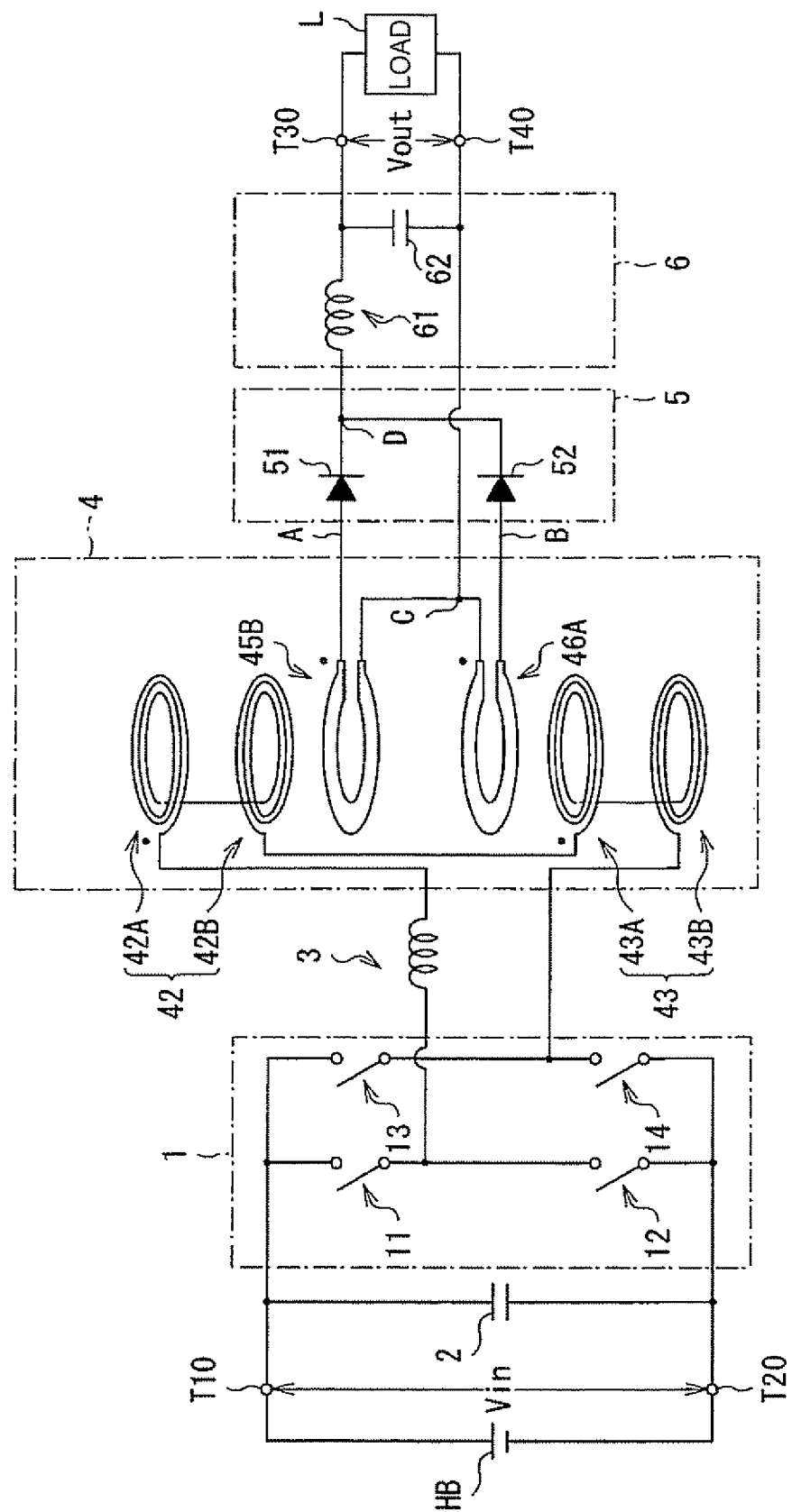
FIG. 24 is a circuit diagram of a DC/DC converter according to another modification.
Figure 25:
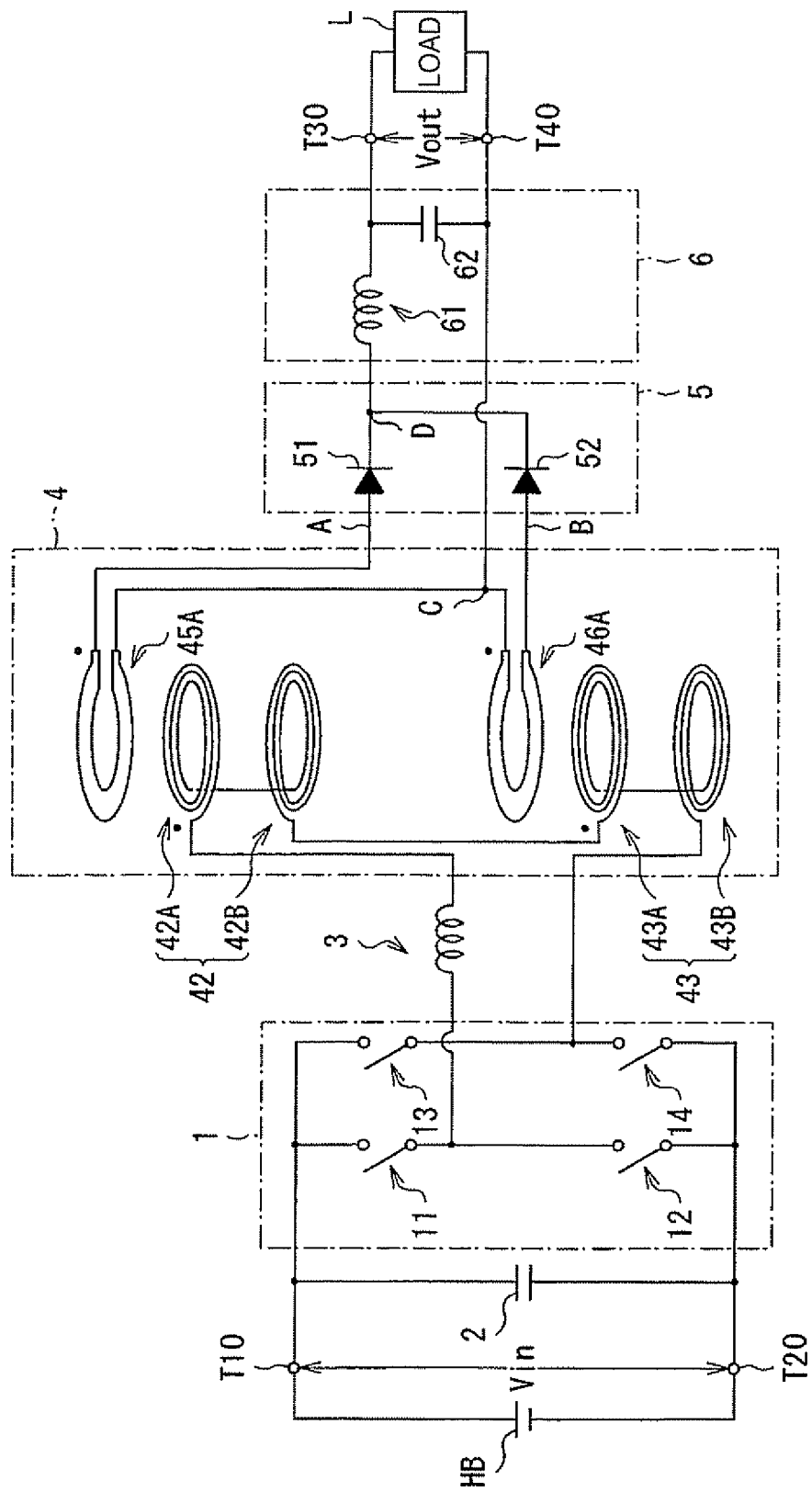
FIG. 25 is a circuit diagram of a DC/DC converter according to another modification.

In the above embodiment, the various coils of the transformer 4, i.e. the secondary side coil 45A, primary side coil 42A, the primary side coil 42B, the secondary side coil 45B, the secondary side coil 46A, the primary side coil 43A, the primary side coil 43B and the secondary side coil 46B are stacked in this order, from the top down. However, a primary side third coil 47, in which a primary side third coil 47A and a primary side third coil 47B are stacked from the top down in this order, may also be inserted between the secondary side coil 45B and the secondary side coil 46A, while preserving the top-down symmetry, as illustrated in FIG. 22. Also, the secondary side coil 45B and the secondary side coil 46A may be omitted, as illustrated in FIG. 23, or the secondary side coil 45A and the secondary side coil 46B may be omitted, as illustrated in FIG. 24, while preserving the top-down symmetry. The secondary side coil 45B and the secondary side coil 46B may be omitted as well, as illustrated in FIG. 25, but without top-down symmetry. In all such cases a large AC resistance need only be arranged in series in the primary side coil 44.

In the above embodiment, the various coils of the transformer 4 are arrayed along a leg of the magnetic core but, as illustrated in FIGS. 26 to 29, the coils can also be arranged concentrically in a perpendicular direction to a leg of the magnetic core.

Figure 26:
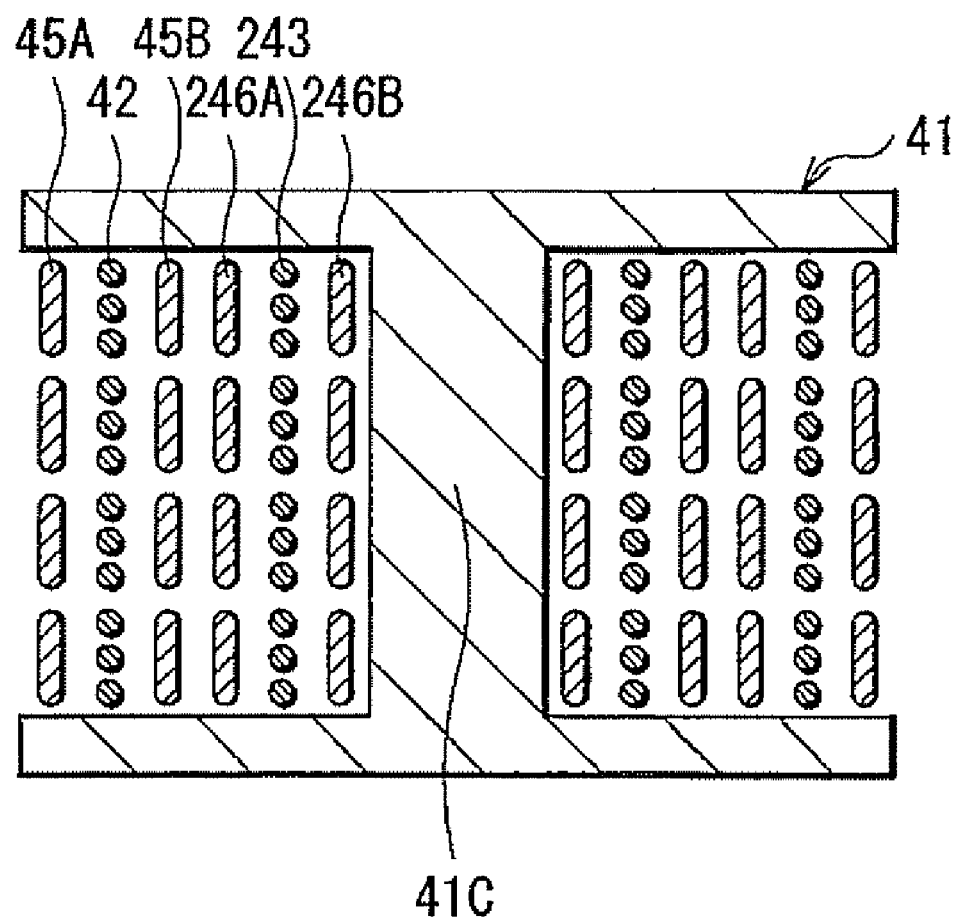
FIG. 26 is a cross-sectional diagram of a transformer.

As illustrated in FIG. 26, the coils 246B, 243, 246A, 45B, 42 and 45A may be wound in this order, from the inside out, around the center leg 41C.

Figure 27:
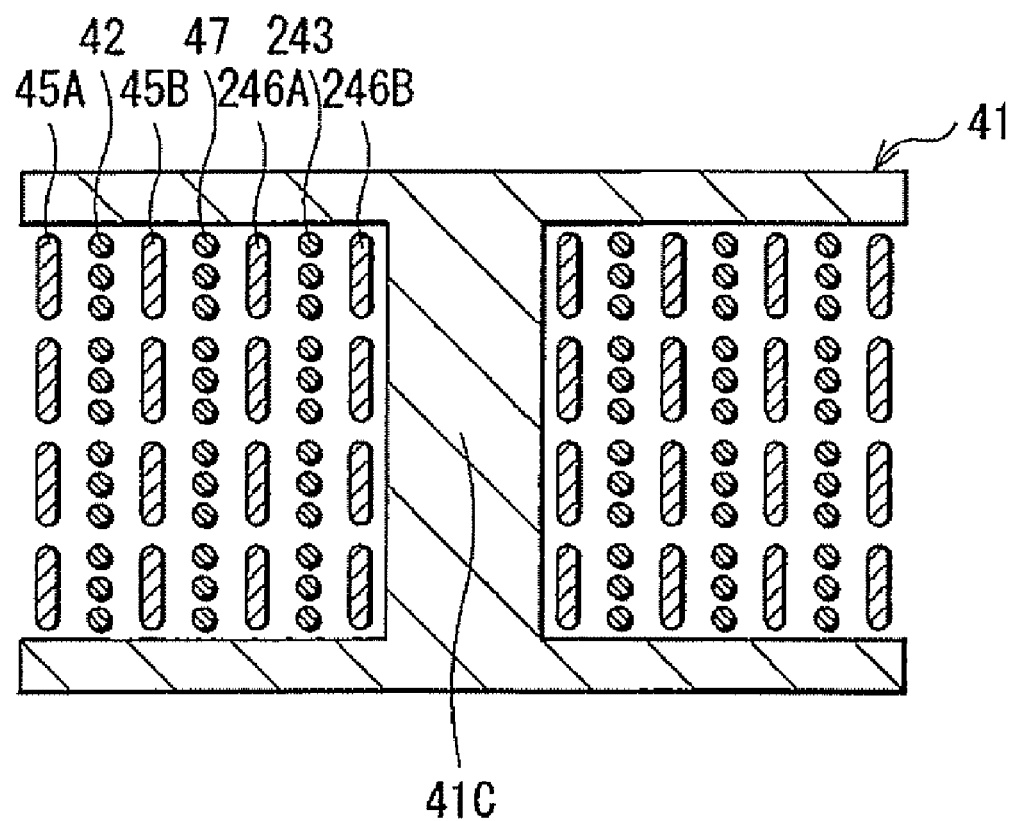
FIG. 27 is a cross-sectional diagram of a transformer.

As illustrated in FIG. 27, the coils 246B, 243, 246A, 47, 45B, 42 and 45A may be wound in this order, from the inside out, around the center leg 41C.

Figure 28:
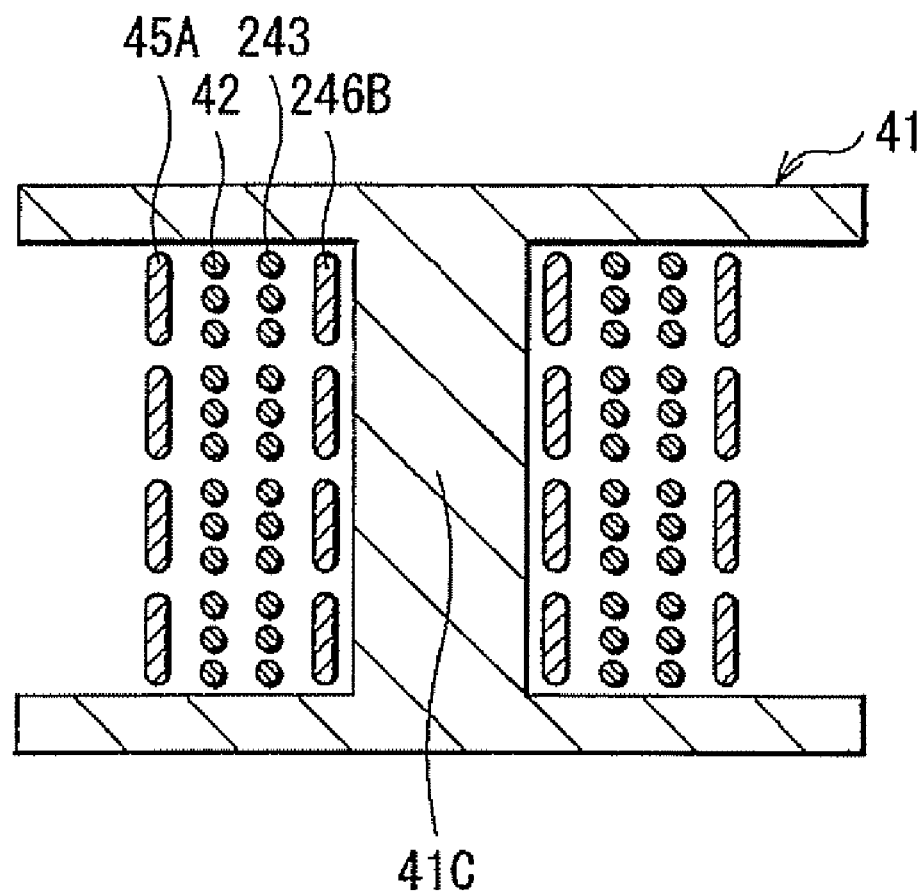
FIG. 28 is a cross-sectional diagram of a transformer.

As illustrated in FIG. 28, the coils 246B, 243, 42 and 45A may be wound in this order, from the inside out, around the center leg 41C.

Figure 29:
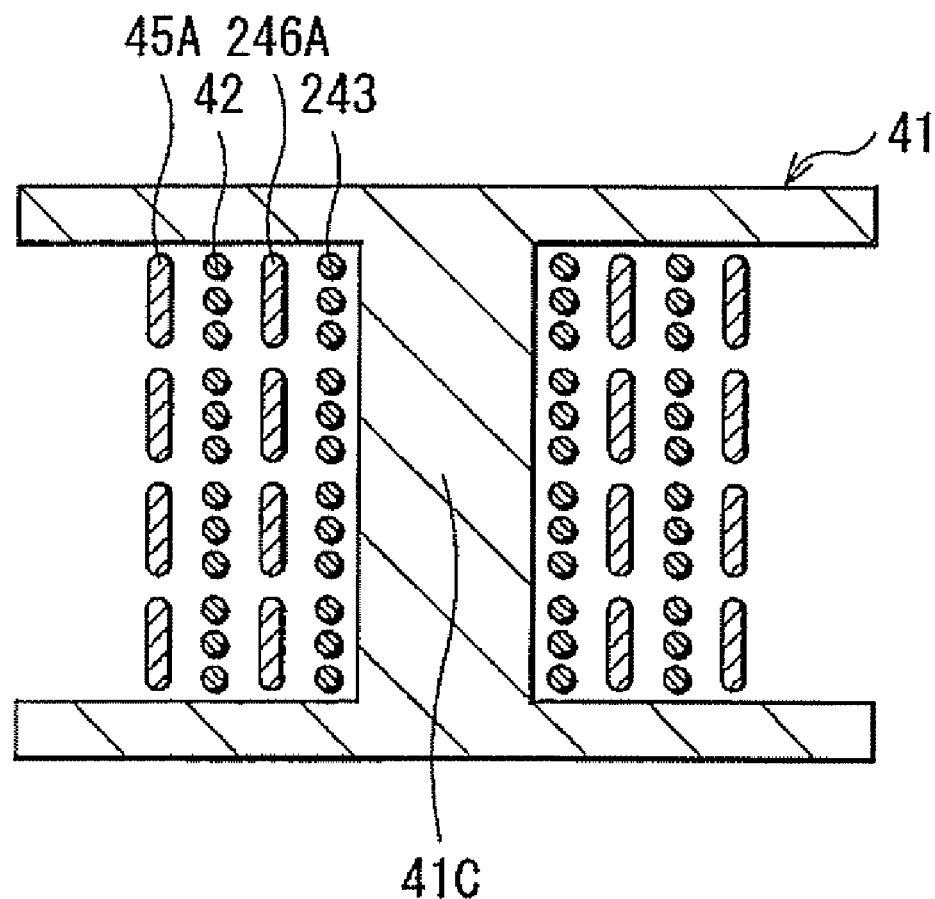
FIG. 29 is a cross-sectional diagram of a transformer.

As illustrated in FIG. 29, the coils 243, 246A, 42 and 45A may be wound in this order, from the inside out, around the center leg 41C.

Figure 30:
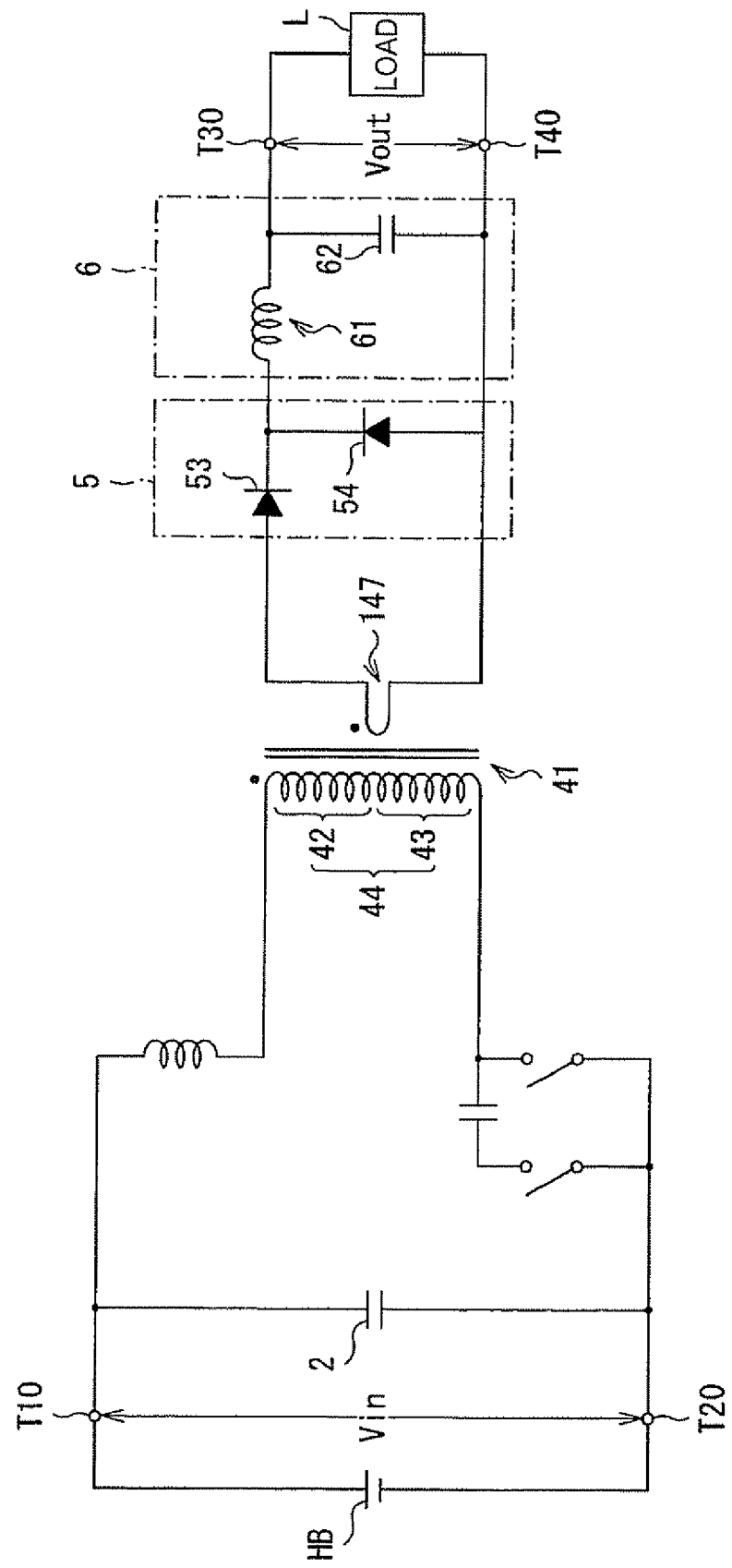
FIG. 30 is a circuit diagram of a DC/DC converter according to another modification.
Figure 31:
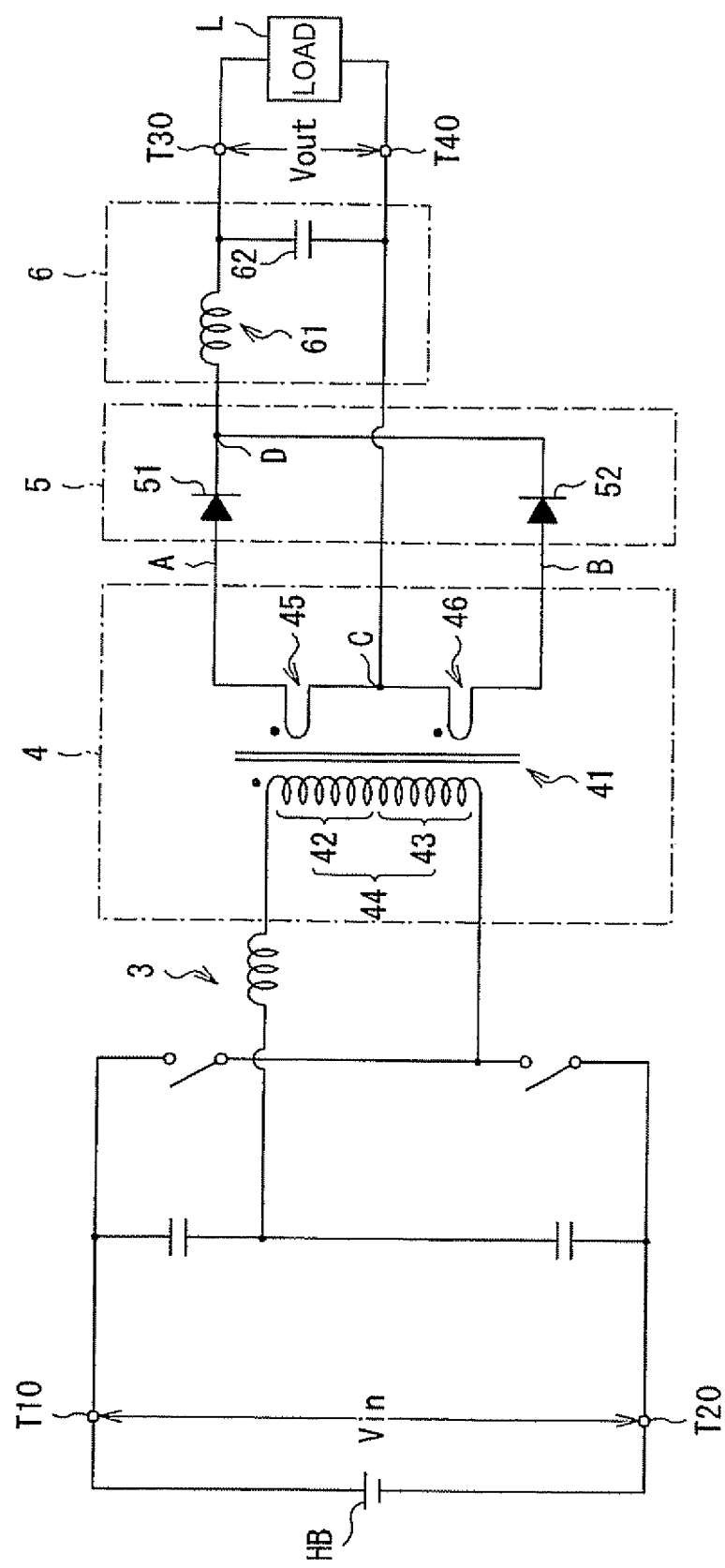
FIG. 31 is a circuit diagram of a DC/DC converter according to another modification.

In the above embodiment, the inverter circuits 1, 10 are of full bridge type or push-pull type, but they may also be, for instance, of forward type, using a secondary side coil 147 such as the one illustrated in FIG. 30, or of half bridge type, as illustrated in FIG. 31. Signals having an AC component can also be outputted by controlling switching timings.

What is claimed is:

1. A switching supply comprising:
   an input part;
   an output part;
   a first transformer having a first coil group;
   a second transformer having a second coil group;
   an inverter circuit connected between the input part and an input terminal of the first and second transformers;
   a rectifier smoothing circuit connected between the output part and an output terminal of the first and second transformers;
   a first coil pair having a primary side coil and a secondary side coil magnetically coupled;
   a second coil pair having a primary side coil and a secondary side coil magnetically coupled;
   a third coil pair having a primary side coil and a secondary side coil magnetically coupled; and
   a fourth coil pair having a primary side coil and a secondary side coil magnetically coupled;
   wherein the first coil group has the first and third coil pairs, the second coil group has the second and fourth coil pairs, the primary side coils included in the first and second coil pairs are mutually connected in series between an input terminal of the first transformer and an input terminal of the second transformer,
   the primary side coils included in the third and fourth coil pairs are mutually connected in series between an input terminal of the first transformer and an input terminal of the second transformer,
   the secondary side coils included in the first and third coil pairs are mutually connected in parallel to the output part, and
   the secondary side coils included in the second and fourth coil pairs are mutually connected in parallel to the output part.

2. The switching supply according to claim 1, wherein the first coil group and the second coil group are each arrayed on a same axis.

3. The switching supply according to claim 2, wherein the primary side coils of the first coil pair and the primary side coils of the second coil pair are formed on a same substrate, and
   the primary side coils of the third coil pair and the primary side coils of the fourth coil pair are formed on a same substrate that differs from the substrate where the primary side coils of the first coil pair and the second coil pair are formed.

4. The switching supply according to claim 1, wherein the AC resistance of the primary side coils included in the first and fourth coil pairs, and the AC resistance of the primary side coils included in the second and third coil pairs are set such that one becomes alternately higher than the other, in synchronization with the switching of the inverter circuit.

5. A switching supply, wherein the switching supply according to claim 1 is a DC/DC converter.

* * * * *